(12) United States Patent
Fu et al.

(10) Patent No.: US 12,739,622 B2
(45) Date of Patent: Sep. 15, 2026

(54) METHODS AND DEVICES IN COMMUNICATION NETWORK

(71) Applicant: Telefonaktiebolaget LM Ericsson (publ), Stockholm (SE)

(72) Inventors: Zhang Fu, Stockholm (SE); Monica Wifvesson, Lund (SE); Juying Gan, Shanghai (CN); Cheng Wang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 342 days.

(21) Appl. No.: 18/556,380

(22) PCT Filed: May 21, 2022

(86) PCT No.: PCT/CN2022/094298
§ 371 (c)(1),
(2) Date: Oct. 20, 2023

(87) PCT Pub. No.: WO2022/242774
PCT Pub. Date: Nov. 24, 2022

(65) Prior Publication Data

US 2024/0196206 A1 Jun. 13, 2024

(30) Foreign Application Priority Data

May 21, 2021 (WO) ................ PCT/CN2021/095349
Apr. 22, 2022 (WO) ................ PCT/CN2022/088626

(51) Int. Cl.
*H04W 12/02* (2009.01)
*G06F 21/60* (2013.01)
*H04W 8/18* (2009.01)

(52) U.S. Cl.
CPC .......... *H04W 12/02* (2013.01); *G06F 21/602* (2013.01); *H04W 8/18* (2013.01)

(58) Field of Classification Search
CPC .. G06F 21/602; H04L 63/0414; H04W 12/02; H04W 12/03; H04W 12/75; H04W 8/18; H04W 88/04
See application file for complete search history.

(56) References Cited

U.S. PATENT DOCUMENTS

2021/0345104 A1* 11/2021 Cheng ............... H04W 12/0433
2022/0141898 A1* 5/2022 Kim ...................... H04W 76/14
370/315

(Continued)

FOREIGN PATENT DOCUMENTS

WO 2018086452 A1 5/2018
WO 2020215280 A1 10/2020
WO 2021030965 A1 2/2021

OTHER PUBLICATIONS

"3rd Generation Partnership Project; Technical Specification Group Core Network and Terminals; Non-Access-Stratum (NAS) protocol for Evolved Packet System (EPS); Stage 3 (Release 17)", 3GPP TS 24.301 V17.2.0, Mar. 2021, 588 pages.

(Continued)

*Primary Examiner* — Kashif Siddiqui
(74) *Attorney, Agent, or Firm* — Murphy, Bilak & Homiller, PLLC

(57) ABSTRACT

The present disclosure provides a method for a relay entity to provide a user ID of a remote UE under privacy protection to a first Network Function (NF) in a network, wherein connectivity between the remote UE and the network is provided by the relay entity, comprising obtaining contact information of a second NF and a private ID corresponding to the user ID from the second NF, wherein the contact information can be used by the first NF to contact the second NF to resolve the user ID based on the private ID; and sending the contact information and the private ID to the first NF. Corresponding methods for the remote UE, the first NF (Continued)

and the second NF are also provided. The corresponding apparatus, system, device, computer-readable storage and carrier, etc. thereof are also provided.

22 Claims, 12 Drawing Sheets

(56) References Cited

U.S. PATENT DOCUMENTS

| | | | | |
|---|---|---|---|---|
| 2022/0279348 | A1* | 9/2022 | Youn | H04W 12/06 |
| 2022/0287116 | A1* | 9/2022 | Kim | H04W 76/12 |
| 2022/0377598 | A1* | 11/2022 | Pan | H04W 76/23 |
| 2023/0020344 | A1* | 1/2023 | Wang | H04W 76/12 |
| 2023/0319556 | A1* | 10/2023 | Wu | H04L 9/0869 |
| 2023/0336992 | A1* | 10/2023 | Kim | H04W 12/069 |
| 2023/0362637 | A1* | 11/2023 | Thiebaut | H04L 63/0884 |
| 2023/0370839 | A1* | 11/2023 | Wifvesson | H04W 12/041 |
| 2023/0413047 | A1* | 12/2023 | Liu | H04W 8/205 |
| 2024/0129746 | A1* | 4/2024 | Morchon | H04W 12/0471 |
| 2025/0220425 | A1* | 7/2025 | Ferdi | H04W 12/069 |

OTHER PUBLICATIONS

"3rd Generation Partnership Project; Technical Specification Group Services and System Aspects; 3G Security; Security architecture (Release 16)", 3GPP TS 33.102 V16.0.0, Jul. 2020, 77 pages.

"3rd Generation Partnership Project; Technical Specification Group Services and System Aspects; Architecture enhancements for 5G System (5GS) to support Vehicle-to-Everything (V2X) services (Release 16)", 3GPP TS 23.287 V16.5.0, Dec. 2020, 58 pages.

"3rd Generation Partnership Project; Technical Specification Group Services and System Aspects; Authentication and Key Management for Applications (AKMA) based on 3GPP credentials in the 5G System (5GS) (Release 17)", 3GPP TS 33.535 V17.1.0, Mar. 2021, 20 pages.

"3rd Generation Partnership Project; Technical Specification Group Services and System Aspects; Generic Authentication Architecture (GAA); Generic Bootstrapping Architecture (GBA) (Release 17)", 3GPP TS 33.220 V17.0.0, Dec. 2020, 95 pages.

"3rd Generation Partnership Project; Technical Specification Group Services and System Aspects; Generic Authentication Architecture (GAA); Generic Bootstrapping Architecture (GBA) Push function (Release 16)", 3GPP TS 33.223 V16.0.0, Jul. 2020, 25 pages.

"3rd Generation Partnership Project; Technical Specification Group Services and System Aspects; Proximity based Services (ProSe) in the 5G System (5GS) (Release 17)", 3GPP TS 23.304 V0.2.0, Apr. 2021, 78 pages.

"3rd Generation Partnership Project; Technical Specification Group Services and System Aspects; Proximity-based Services (ProSe); Security aspects (Release 16)", 3GPP TS 33.303 V16.0.0, Jul. 2020, 90 pages.

"3rd Generation Partnership Project; Technical Specification Group Services and System Aspects; Proximity-based services (ProSe); Stage 2 (Release 16)", 3GPP TS 23.303 V16.0.0, Jul. 2020, 130 pages.

"3rd Generation Partnership Project; Technical Specification Group Services and System Aspects; Security aspects of 3GPP support for advanced Vehicle-to-Everything (V2X) services (Release 16)", 3GPP TS 33.536 V16.3.0, Mar. 2021, 24 pages.

"3rd Generation Partnership Project; Technical Specification Group Services and System Aspects; Security Aspects of Proximity based Services (ProSe) in the 5G System (5GS) (Release 17)", 3GPP TS 33.xxx V0.0.0 (3GPP TS 33.503) (S3-213638 was S3-213470-r3), Sep. 2021, 12 pages.

"3rd Generation Partnership Project; Technical Specification Group Services and System Aspects; Study on security aspects of enhancement for proximity based services in the 5G System (5GS) (Release 17)", 3GPP TR 33.847 V0.5.0, Mar. 2021, 120 pages.

"3rd Generation Partnership Project; Technical Specification Group Services and System Aspects; Study on system enhancement for Proximity based Services (ProSe) in the 5G System (5GS) (Release 17)", 3GPP TR 23.752 V17.0.0, Mar. 2021, 183 pages.

"3rd Generation Partnership Project; Technical Specification Group Services and System Aspects; System architecture for the 5G System (5GS); Stage 2 (Release 17)", 3GPP TS 23.501 V17.0.0, Mar. 2021, 489 pages.

3GPP, "3rd Generation Partnership Project; Technical Specification Group Services and System Aspects; Procedures for the 5G System (5GS); Stage 2 (Release 17)", 3GPP TS 23.502 V17.0.0, Mar. 2021, 1-646.

3GPP, "3rd Generation Partnership Project; Technical Specification Group Services and System Aspects; Security architecture and procedures for 5G system (Release 17)", 3GPP TS 33.501 V17.1.0, Mar. 2021, 1-256.

Unknown, Author, "3rd Generation Partnership Project; Technical Specification Group Services and System Aspects; Study on security Architecture Enhancements to ProSe UE-to-Network Relay (Release 15)", 3GPP TR 33.843 0.3.0, S3-173477, 2017, 1-36.

Unknown, Author, "Remove Editor's Note in subclause 6.7.2 of Solution #7", 3GPP TSG SA WG3 (Security) Meeting 089, Nov. 27-Dec. 1, 2017, Reno (US), S3-173243 revision of S3-I 7xabc, 1-3.

* cited by examiner

METHODS AND DEVICES IN COMMUNICATION NETWORK

TECHNICAL FIELD

The present disclosure generally relates to the technical field of telecommunications, and more specifically to methods, network elements, devices, computer-readable storage medium and carrier, etc. in a telecommunication network.

BACKGROUND

This section is intended to provide a background for the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

FIG. 1*a* illustrates a high-level view of an exemplary NG (such as 5G mobile wireless) network architecture where embodiments of the present disclosure may apply, including a Next Generation Radio Access Network (NG-RAN) 104 and a NG Core (NGC) 106. As shown in the figure, NG-RAN 104 can include gNBs 1041 (e.g., 1041*a*, 1041*b*) and ng-eNBs 1042 (e.g., 1042*a*, 1042*b*) that are interconnected with each other via respective Xn interfaces. The gNBs and ng-eNBs are also connected via the NG interfaces to NGC 106, more specifically to the AMF (Access and Mobility Management Function) 208 (e.g., AMFs 208*a*, 208*b*) via respective NG-C interfaces and to the UPF (User Plane Function) 212 (e.g., UPFs 212*b*, 212*a*) via respective NG-U interfaces.

Each of the gNBs 1041 can support the NR radio interface, including frequency division duplexing (FDD), time division duplexing (TDD), or a combination thereof. In contrast, each of ng-eNBs 1042 supports the LTE radio interface but, unlike conventional LTE eNBs (such as shown in FIG. 1*a*), connect to the NGC via the NG interface.

Deployments based on different 3GPP architecture options (e.g., EPC-based or 5GC-based) and UEs with different capabilities (e.g., EPC NAS and 5GC NAS) may coexist at the same time within one network (e.g., PLMN). It is generally assumed that a UE that can support 5GC NAS procedures can also support EPC NAS procedures to operate in legacy networks, such as when roaming. As such, the UE will use EPC NAS or 5GC NAS procedures depending on the core network (CN) by which it is served.

Another change in NG networks (e.g., in 5GC) is that traditional peer-to-peer interfaces and protocols (e.g., those found in LTE/EPC networks) are modified by a so-called Service Based Architecture (SBA) in which Network Functions provide one or more services to one or more service consumers. This can be done, for example, by Hyper Text Transfer Protocol/Representational State Transfer (HTTP/REST) application programming interfaces (APIs).

The services are composed of various "service operations", which are more granular divisions of the overall service functionality. In order to access a service, both the service name and the targeted service operation must be indicated. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

This architecture model, which further adopts principles like modularity, reusability and self-containment of network functions, can enable deployments to take advantage of the latest virtualization and software technologies.

FIG. 1*b* illustrates a service-based architecture for an exemplary non-roaming 5G or Next Generation Core Network (5GCN/NGCN/NCN). This illustration depicts logical connections between nodes and functions, and its illustrated connections should not be interpreted as direct physical connections. UE 210 forms a radio access network connection with a (Radio) Access Network ((R)AN) node 211 (which may, for example, be an gNodeB (gNB)), which is connected to a CN User Plane (UP) Function (UPF) 212 such as a UP Gateway over a network interface providing a defined interface such as an N3 interface. UPF 212 provides a logical connection to a Data Network (DN) 213 over a network interface such as an N6 interface. The radio access network connection between the UE 210 and the (R)AN node may be referred to as a Data Radio Bearer (DRB).

DN 213 may be a data network used to provide an operator service, or it may be outside the scope of the standardization of the Third Generation Partnership Project (3GPP), such as the Internet, a network used to provide third party service, and in some embodiments DN 213 may represent an Edge Computing network or resource, such as a Mobile Edge Computing (MEC) network.

UE 210 also connects to the Access and Mobility Management Function (AMF) 208 through a logical N1 connection (although the physical path of the connection is not direct). The AMF 208 is responsible for authentication and authorization of access requests, as well as mobility management functions. The AMF 208 may perform other roles and functions as defined by the 3GPP Technical Specification (TS) 23.501. In a service based view, AMF 208 can communicate with other core network control plane functions through a service based interface denoted as Namf.

The Session Management Function (SMF) 209 is a network function that is responsible for the allocation and management of IP addresses that are assigned to an ED as well as the selection of a UPF 212 (or a particular instance of a UPF 212) for traffic associated with a particular session of UE 210. It will be appreciated that there will typically be multiple SMFs 209 in the network 226, each of which may be associated with a respective group of UEs 210, (R)AN nodes 211 or UPFs 212. The SMF 209 can communicate with other core network functions, in a service based view, through a service based interface denoted as Nsmf. The SMF 209 may also connect to a UPF 212 through a logical interface such as network interface N4. There is also the possibility to use an SMF as an Intermediate SMF (I-SMF). I-SMF is an SMF that is inserted to support a PDU session as the UE is located in an area which cannot be controlled by the original SMF because the UPF(s) belong to a different SMF Service Area.

The Authentication Server Function (AUSF) 207, provides authentication services to other network functions over a service based Nausf interface.

A Network Exposure Function (NEF) 202 can be deployed in the network to allow servers, functions and other entities such as those outside a trusted domain to have exposure to services and capabilities within the network. In one such example, an NEF 202 can act much like a proxy between an application server outside the illustrated network and network functions such as the Policy Control Function (PCF) 204, the SMF 209, the UDM 205, and the AMF 208, so that the external application server can provide information that may be of use in the setup of the parameters associated with a data session. The NEF 202 can communicate with other network functions through a service based Nnef network interface. The NEF 202 may also have an interface to non-3GPP functions.

A Network Repository Function (NRF) 203, provides network element discovery functionality. The NRF 203 may be specific to the Public Land Mobility Network (PLMN) or network operator, with which it is associated. The service discovery functionality can allow network functions and UEs connected to the network to determine where and how to access existing network functions, and may present the service based interface Nnrf.

PCF 204 communicates with other network functions over a service based Npcf interface, and can be used to provide policy and rules to other network functions, including those within the control plane. Enforcement and application of the policies and rules is not necessarily the responsibility of the PCF 204, and is instead typically the responsibility of the functions to which the PCF 204 transmits the policy. In one such example the PCF 204 may transmit policy associated with session management to the SMF 209. This may be used to allow for a unified policy framework with which network behavior can be governed.

A Unified Data Management Function (UDM) 205 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 205 may employ an interface, such as Nudr to connect to a User Data Repository (UDR) 214. The PCF 204 may be associated with the UDM 205 because it may be involved with requesting and providing subscription policy information to the UDR 214, but it should be understood that typically the PCF 204 and the UDM 205 are independent functions.

The PCF 204 may have a direct interface to the UDR 214 or can use Nudr interface to connect with UDR 214. The UDM 205 can receive requests to retrieve content stored in the UDR 214, or requests to store content in the UDR 214. The UDM 205 is typically responsible for functionality such as the processing of credentials, location management and subscription management. The UDR 214 may also support any or all of Authentication Credential Processing, User Identification handling, Access Authorization, Registration/Mobility management, subscription management, and Short Message Service (SMS) management. The UDR 214 is typically responsible for storing data provided by the UDM 205. The stored data is typically associated with policy profile information (which may be provided by PCF 204) that governs the access rights to the stored data. In some embodiments, the UDR 214 may store policy data, as well as user subscription data which may include any or all of subscription identifiers, security credentials, access and mobility related subscription data and session related data.

The Application Function (AF) 206 represents the non-data plane (also referred to as the non-user plane) functionality of an application deployed within a network operator domain and within a 3GPP compliant network. The AF 206 interacts with other core network functions through a service based Naf interface, and may access network capability exposure information, as well as provide application information for use in decisions such as traffic routing. The AF 206 can also interact with functions such as the PCF 204 to provide application specific input into policy and policy enforcement decisions. It should be understood that in many situations the AF 206 does not provide network services to other NFs, and instead is often viewed as a consumer or user of services provided by other NFs. An application outside the 3GPP network, can perform many of the same functions as AF 206 through the use of NEF 202.

The UE 210 communicates with network functions that are in the User Plane (UP), and the Control Plane (CP). The UPF 212 is a part of the CN UP (DN 213 being outside the 5GCN). (R)AN node 211 may be considered as a part of a User Plane, but because it is not strictly a part of the CN, it is not considered to be a part of the CN UP or UPF 212. AMF 208, SMF 209, AUSF 207, NEF 202, NRF 203, PCF 204, and UDM 205 are functions that reside within the CN CP, and are often referred to as Control Plane Functions. AF 206 may communicate with other functions within CN CP (either directly or indirectly through the NEF 202), but is typically not considered to be a part of the CN CP.

The DN-AAA server 215 may belong to the 5GC (not shown) or to the DN. The DN-AAA server performs authentication and authorization. The response (when positive) may contain network information, such as an IPV4 address and/or IPv6 prefix for the user when the SMF 209 is interworking with the DN-AAA server. If in the DN, the DN-AAA server will communicate with SMF 209 via the UPF 212, and if in the 5GC, the DN-AAA server will communicate with SMF 209 directly.

There are also other network functions existed in the 5GC but not illustrated in FIG. 1*b* but illustrated in FIG. 2*b*, such as UE-to-Network Relay 216, also referred to as 5G ProSe UE-to-Network Relay, which is a UE that provides functionality to support connectivity to the network for Remote UE(s), and also Remote UE 2201, which is a 5G ProSe-enabled UE that communicates with a DN 213 via a 5G ProSe UE-to-Network Relay.

SUMMARY

FIGS. 2*a*-2*b* illustrates a scenario where embodiments of the present disclosure may apply, which is also recited in Sol #6 in TR 23.752 v17.0.0.

FIG. 2*a* illustrates an example scenario of direct or indirect network communication path between UE 210 and Network 220. The case that UE 210 may be able to access to network 220 via the direct network communication or the indirect network communication is illustrated in FIG. 2*a*, where path #1 is direct network communication path that may not exist, as well as path #2 and path #3 are indirect network communication paths via different UE-to-Network Relays 216*a* and 216*b*. Direct network communication is one mode of network communication, where there is no UE-to-Network Relay entity between a UE and the 5G network. Indirect network communication is another mode of network communication, where there is a UE-to-Network Relay entity between a UE and the 5G network.

FIG. 2*b* illustrates an architecture model where embodiments of the present disclosure may apply. As discussed above, the 5G ProSe UE-to-Network Relay entity provides the functionality to support connectivity to the network for Remote UEs. It can be used for both public safety services and commercial services (e.g. interactive service).

A UE is considered to be a Remote UE for a certain ProSe UE-to-Network relay if it has successfully established a PC5 link to this ProSe 5G UE-to-Network Relay. A Remote UE can be located within NG-RAN coverage or outside of NG-RAN coverage.

Remote UE 210 may perform communication path selection between direct Uu path and indirect Uu path based on the link quality and the configured threshold (pre-configured or provided by NG-RAN). For example, if Uu link quality exceeds configured threshold, the direct Uu path is selected. Otherwise, the indirect Uu path is selected by performing the UE-to-Network Relay discovery and selection.

AS 215*a* is an Application Server outside the 5GC that may provide various application services.

The ProSe 5G UE-to-Network Relay 216 shall relay unicast traffic (UL and DL) between the Remote UE 210 and the network 220. The ProSe UE-to-Network Relay 216 shall provide generic function that can relay any IP, Ethernet or Unstructured traffic. For IP traffic over PC5 reference point, the ProSe UE-to-Network Relay 216 uses IP type PDU Session towards 5GC. For Ethernet traffic over PC5 reference point, the ProSe UE-to-Network Relay 216 can use Ethernet type PDU Session or IP type PDU Session towards 5GC. For Unstructured traffic over PC5 reference point, the ProSe UE-to-Network Relay 216 can use unstructured type PDU Session or IP type PDU Session (i.e. IP encapsulation/de-capsulation by UE-to-Network Relay) towards 5GC.

The type of traffic supported over PC5 reference point is indicated by the ProSe UE-to-Network Relay 216 e.g. using the corresponding Relay Service Code. The UE-to-Network Relay determines the PDU Session Type based on, e.g. ProSe policy/parameters, URSP rule, Relay Service Code, etc.

How the UE-to-NW relay 216 determines PDU session type should be evaluated independent from other part of this solution while considering other PDU session parameters, e.g. DNN, SSC mode.

IP type PDU Session and Ethernet type PDU Session can be used to support more than one Remote UEs while Unstructured type PDU Session can be used to support only one Remote UE.

The maximum number of PDU Sessions can affect the maximum number of Remote UEs that the UE-to-Network Relay can support.

Hop-by-hop security is supported in the PC5 link and Uu link. If there are requirements beyond hop-by-hop security for protection of Remote UE's traffic, security over PDU layer needs to be applied.

A ProSe 5G UE-to-Network Relay capable entity 210 may be a UE and may register to the network 220 (if not already registered) and establish a PDU session enabling the necessary relay traffic, or it may need to connect to additional PDU session(s) or modify the existing PDU session in order to provide relay traffic towards Remote UE(s). PDU session(s) supporting UE-to-Network Relay shall only be used for Remote ProSe UE(s) relay traffic.

FIG. 3 illustrates a procedure of how the ProSe 5G UE-to-Network Relay works.

At step 30*a* and 30*b*, during the Registration procedure, authorization and provisioning is performed for the ProSe UE-to-NW relay (step30*a*) and Remote UE (step 30*b*). Authorization and provisioning procedure may be any solution for key issue #1—ProSe Direct discovery and #3—Support of UE-to-Network Relay described in 3GPP 23.752 V 17.0.0.

At step 31, the ProSe 5G UE-to-Network Relay 216 may establish a PDU session for relaying with default PDU session parameters received in step 30*b* or pre-configured in the UE-to-NW relay 216, e.g. S-NSSAI, DNN, SSC mode or PDU Session Type. In case of IP PDU Session Type and IPV6, the ProSe UE-to-Network Relay obtains the IPV6 prefix via prefix delegation function from the network as defined in TS 23.501.

At step 32, based on the Authorization and provisioning in step 30*a*, the Remote UE 210 performs discovery of a ProSe 5G UE-to-Network Relay using any solution for key issue #1—ProSe Direct discovery and #3—Support of UE-to-Network Relay described in 3GPP 23.752 V 17.0.0. As part of the discovery procedure the Remote UE learns about the connectivity service the ProSe UE-to-Network Relay provides.

At step 331, the Remote UE selects a ProSe 5G UE-to-Network Relay 216 and establishes a connection n for One-to-one ProSe Direct Communication as described in TS 23.287.

If there is no PDU session satisfying the requirements of the PC5 connection with the remote UE, e.g. S-NSSAI, DNN, QOS, the ProSe 5G UE-to-Network Relay 216 initiates a new PDU session establishment or modification procedure for relaying at step 332.

According to the PDU Session Type for relaying, the ProSe 5G UE-to-Network Relay 216 performs relaying function at the corresponding layer, e.g. acts as an IP router when the traffic type is IP, acts as an Ethernet switch when the traffic type is Ethernet, and performs generic forwarding for Unstructured traffic.

When the ProSe 5G UE-to-Network Relay 216 uses unstructured PDU session type for Unstructured traffic over PC5 reference point, it creates a mapping between the PC5 Link Identifier and the PDU Session ID, and a mapping between PFI for PC5 L2 link and the QFI for the PDU Session.

When the ProSe 5G UE-to-Network Relay 216 uses IP PDU session type for Ethernet or unstructured traffic over PC5 reference point, it locally assigns an IP address/prefix for the Remote UE and use that to encapsulate the data from the Remote UE 210. For downlink traffic, the ProSe 5G UE-to-Network Relay 216 decapsulates the traffic from the IP headers and forwards to the corresponding Remote UE 210 via PC5 reference point.

The ProSe 5G UE-to-Network Relay's subscription, and if applicable the Remote UE's subscription, can be considered for QoS decision. if the ProSe 5G UE-to-Network Relay reports Remote UE's SUCI to network, as described in sol #47 step 3, 5, 7, of in 3GPP 23.752 V 17.0.0. Relay UE's AMF gets Remote UE's SUPI from Remote UE's AUSF. Then Relay UE's AMF retrieves Remote UE's subscribed UE-AMBR from Remote UE's UDM using Remote UE's SUPI. Relay UE's AMF could also provide Remote UE's SUPI together with N1 SM container (PDU Session Establishment Request) to Relay UE's SMF, then Relay UE's SMF retrieves Remote UE's subscribed QoS profile and Subscribed Session-AMBR from Remote UE's UDM. Relay UE's AMF 208 and SMF 209 then provides Remote UE's subscription to PCF for QoS decision.

The UE-to-Network Relay 216 distinguishes and performs the rate limitation for the traffic of a specific Remote UE, if the configuration from PCF supports to do that.

At step 34, for IP PDU Session Type and IP traffic over PC5 reference point, IPv6 prefix or IPv4 address is allocated for the remote UE as it is defined in TS 23.303 clauses 5.4.4.2 and 5.4.4.3. From this point the uplink and downlink relaying can start. For downlink traffic forwarding, the PC5 QOS Rule is used to map the downlink IP packet to the PC5

QoS Flow. For uplink traffic forwarding, the 5G QOS Rule is used to map the uplink IP packet to the Uu QoS Flow.

At step 35, the ProSe 5G UE-to-Network Relay 216 sends a Remote UE Report (Remote User ID, Remote UE info) message to the SMF 209 for the PDU session associated with the relay. The Remote User ID is an identity of the Remote UE user (provided via User Info) that was successfully connected in step 331. The Remote UE info is used to assist identifying the Remote UE in the 5GC. For IP PDU Session Type, the Remote UE info is Remote UE IP info. For Ethernet PDU Session Type, the Remote UE info is Remote UE MAC address which is detected by the UE-to-Network Relay. For Unstructured PDU Session Type, the Remote UE info contains the PDU session ID. The SMF 209 stores the Remote User IDs and the related Remote UE info (if available) in the ProSe 5G UE-to-Network Relay's SM context for this PDU session associated with the relay.

For IP info the following principles apply:

for IPV4, the UE-to-network Relay 216 shall report TCP/UDP port ranges assigned to individual Remote UE(s) (along with the Remote User ID); for IPV6, the UE-to-network Relay shall report IPv6 prefix(es) assigned to individual Remote UE(s) (along with the Remote User ID).

The Remote UE Report message shall be sent when the Remote UE disconnects from the ProSe 5G UE-to-Network Relay 216 (e.g. upon explicit layer-2 link release or based on the absence of keep alive messages over PC5) to inform the SMF 209 that the Remote UE(s) have left.

In the case of Registration Update procedure involving SMF change the Remote User IDs and related Remote UE info corresponding to the connected Remote UEs are transferred to the new SMF as part of SM context transfer for the ProSe 5G UE-to-Network Relay.

In order for the SMF 209 to have the Remote UE(s) information, the HPLMN and the VPLMN where the ProSe 5G UE-to-Network Relay is authorized to operate, needs to support the transfer of the Remote UE related parameters in case the SMF is in the HPLMN.

When Remote UE(s) disconnect from the ProSe UE-to-Network Relay, it is up to implementation how relaying PDU sessions are cleared/disconnected by the ProSe 5G UE-to-Network Relay.

After being connected to the ProSe 5G UE-to-Network Relay 216, the Remote UE 210 keeps performing the measurement of the signal strength of PC5 unicast link with the ProSe 5G UE-to-Network Relay 216 for relay reselection.

The solution can also work when the ProSe 5G UE-to-Network Relay UE connects in EPS using LTE. In this case for the Remote UE report the procedures defined in TS 23.303 can be used.

The solution has impacts in the following entities: SMF needs to support procedures for Remote UE report, and UE needs to support procedures for Remote UE and ProSe 5G UE-to-Network Relay.

When ProSe UE-to-NW relay 216 sends Remote UE report to SMF 209, which information should be used as the Remote User ID is not addressed yet. If Subscription Permanent Identifier (SUPI) is used as the Remote User ID, then it may violate the privacy requirement that the remote UE's SUPI should not be revealed to the ProSe UE-to-NW relay 216.

It is one or more object(s) of the present disclosure to address one or more of the problems arisen above.

According to a first aspect of the disclosure, there is provided a method for a relay entity to provide a user ID of a remote UE under privacy protection to a first Network Function (NF) in a network, wherein connectivity between the remote UE and the network is provided by the relay entity.

The method comprising the following actions: obtaining contact information of a second NF and a private ID corresponding to the user ID from the second NF, wherein the contact information can be used by the first NF to contact the second NF to resolve the user ID based on the private ID; and sending the contact information and the private ID to the first NF.

According to a second aspect of the disclosure, there is provided a method for a first Network Function (NF) in a network to obtain a user ID of a remote UE under privacy protection, wherein connectivity between the remote UE and the network is provided by a relay entity. The method comprising the following steps.

Firstly, contact information of a second NF and a private ID corresponding to the user ID are received from the relay entity, wherein the contact information can be used by the first NF to contact the second NF to resolve the user ID based on the private ID.

Correspondingly, the user ID is obtained based on the private ID.

According to a third aspect of the disclosure, there is provided a method for a second Network Function (NF) to provide privacy protection for a user ID of a remote User Equipment (UE), wherein connectivity between the remote UE and a network is provided by a relay entity in the network.

The method comprises the following steps

Firstly, contact information of the second NF and a private ID corresponding to the user ID is provided to the relay entity.

Secondly, the private ID is resolved into the user ID upon a request from a first NF in the network.

Then the user ID is sent to the first NF.

According to a fourth aspect of the disclosure, there is provided a method for a remote User Equipment (UE) to obtain its user ID under privacy protection, wherein connectivity between the remote UE and a network is provided by a relay entity.

The method comprises the following steps.

Firstly, contact information of a second NF and a private ID corresponding to the user ID are obtained from the second NF, wherein the contact information can be used by a first NF to contact the second NF to resolve the user ID based on the private ID.

Secondly, the contact information and the private ID is sent to the relay entity.

According to a fifth aspect of the disclosure, there is provided a communication device in a communication network. The communication device comprises a storage adapted to store instructions therein and a processor adapted to execute the instructions to cause the communication device to perform the steps of any of the methods herein.

According to a sixth aspect of the disclosure, there is provided a computer-readable storage. The computer-readable storage stores computer-executable instructions thereon, when executed by a computing device, causing the computing device to implement the method of any of any of the methods herein.

According to a seventh aspect of the disclosure, there is provided a computer program product. The computer program product comprises instructions which, when executed on at least one processor, cause the at least one processor to carry out the method according to any one of the methods herein.

According to an eighth aspect of the disclosure, there is provided a carrier containing the computer program of the eighth embodiment, wherein the carrier is one of an electronic signal, optical signal, radio signal, or computer readable storage.

According to a ninth aspect of the disclosure, there is provided an apparatus adapted to perform the method according to any one of the methods herein.

According to a tenth aspect of the disclosure, there is provided an apparatus of a relay entity to provide a user ID of a remote UE under privacy protection to a first Network Function in a network, wherein connectivity between the remote UE and the network is provided by the relay entity.

The apparatus comprises a first obtaining component and a first sending component.

The first obtaining component is configured to contact information of a second NF and a private ID corresponding to the user ID from the second NF, wherein the contact information can be used by the first NF to contact the second NF to resolve the user ID based on the private ID; and The first sending component is configured to send the contact information and the private ID to the first NF.

According to a tenth aspect of the disclosure, there is provided an apparatus of a first Network Function in a network to obtain a user ID of a remote UE under privacy protection, wherein connectivity between the remote UE and the network is provided by a relay entity.

The apparatus comprises a receiving component and a second obtaining component.

The receiving component is configured to receive contact information of a second NF and a private ID corresponding to the user ID from the relay entity, wherein the contact information can be used by the first NF to contact the second NF to resolve the user ID based on the private ID.

The second obtaining component is configured to obtain the user ID based on the private ID.

According to a eleventh aspect of the disclosure, there is provided an apparatus of a second Network Function to provide privacy protection for a user ID of a remote User Equipment (UE), wherein connectivity between the remote UE and a network is provided by a relay entity in the network.

The apparatus comprises a providing component, a resolving component and a second sending component.

The providing component is configured to provide contact information of the second NF and a private ID corresponding to the user ID to the relay entity.

The resolving component is configured to resolve the private ID into the user ID upon a request from a first NF in the network.

The second sending component is configured to send the user ID to the first NF.

According to a twelfth aspect of the disclosure, there is provided an apparatus of a remote User Equipment to obtain its user ID under privacy protection, wherein connectivity between the remote UE and a network is provided by a relay entity.

The apparatus comprises a third obtaining component and a third sending component.

The third obtaining component is configured to obtain contact information of a second NF and a private ID corresponding to the user ID from the second NF, wherein the contact information can be used by a first NF to contact the second NF to resolve the user ID based on the private ID.

The third sending component is configured to send the contact information and the private ID to the relay entity.

The second NF only resolves and provides a user ID of the remote UE upon a request from the first NF, thus there is no way for the Relay UE 216 to obtain or know the user ID even if the Relay UE 216 contacts the second NF to ask the user ID (in this case, the second NF will reject the Relay UE 216), which ensures the privacy protection for the user ID. In addition, because the private ID may be fully controlled by the second NF, and could be designated for interim (e.g., one time) usage, this may prevent a malicious Relay UE 216 to get the user ID, replaying the user ID to launch an attack to the remote UE.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and details through use of the accompanying drawings.

DETAILED DESCRIPTION

Figure 1A:
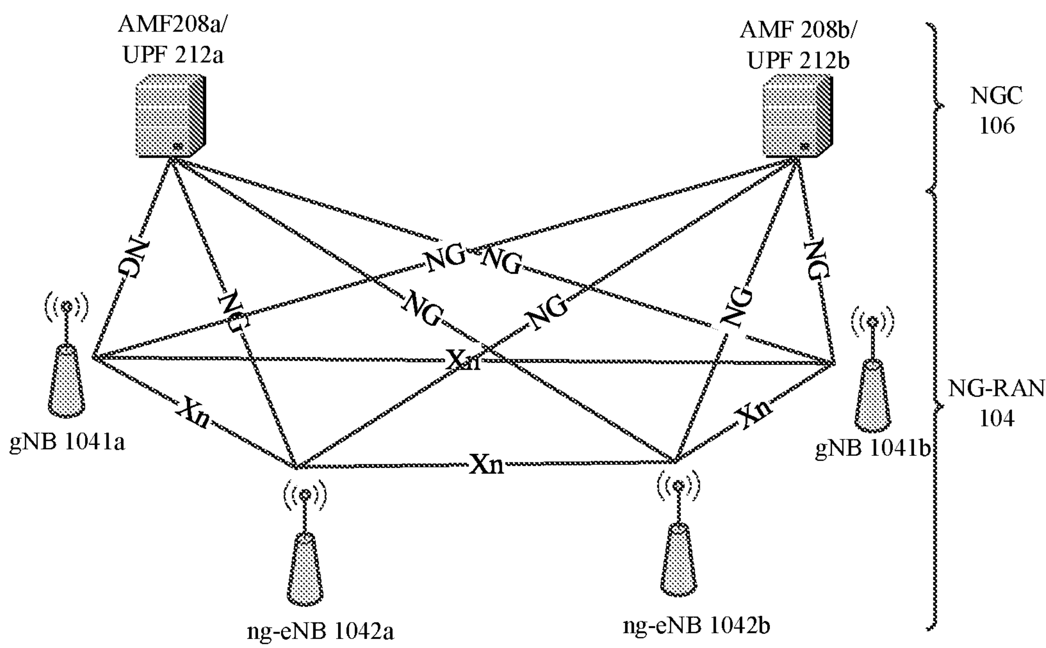
FIG. 1*a* illustrates a high-level view of an exemplary 5G network architecture where embodiments of the present disclosure may apply.
Figure 1B:
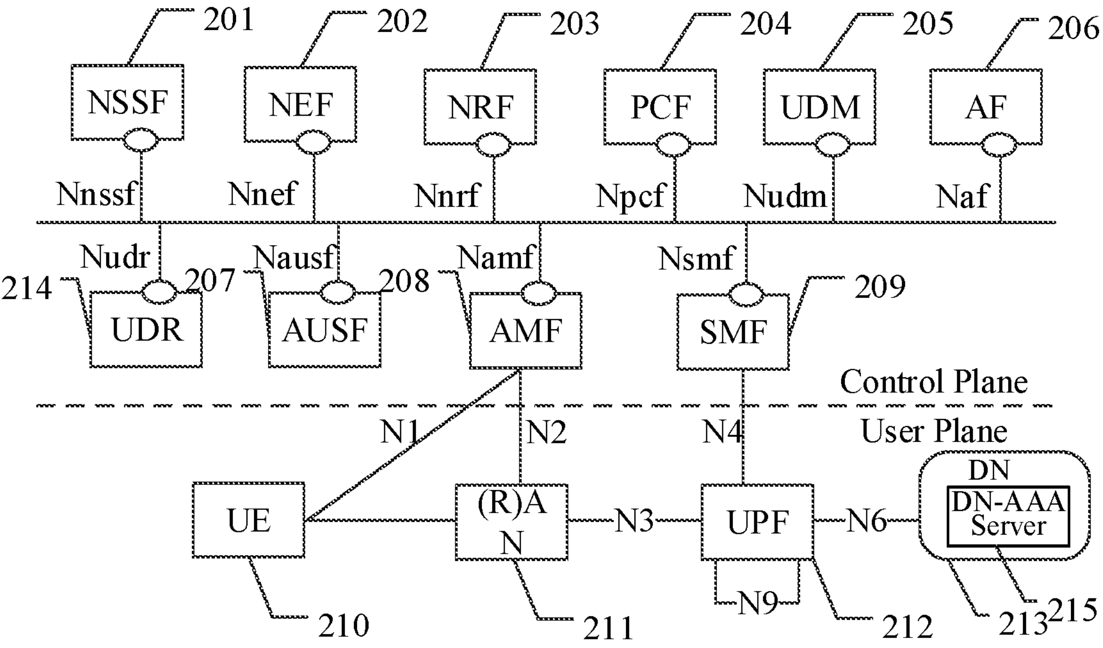
FIG. 1*b* illustrates a service-based architecture for an exemplary non-roaming 5G or Next Generation Core Network.
Figure 2A:
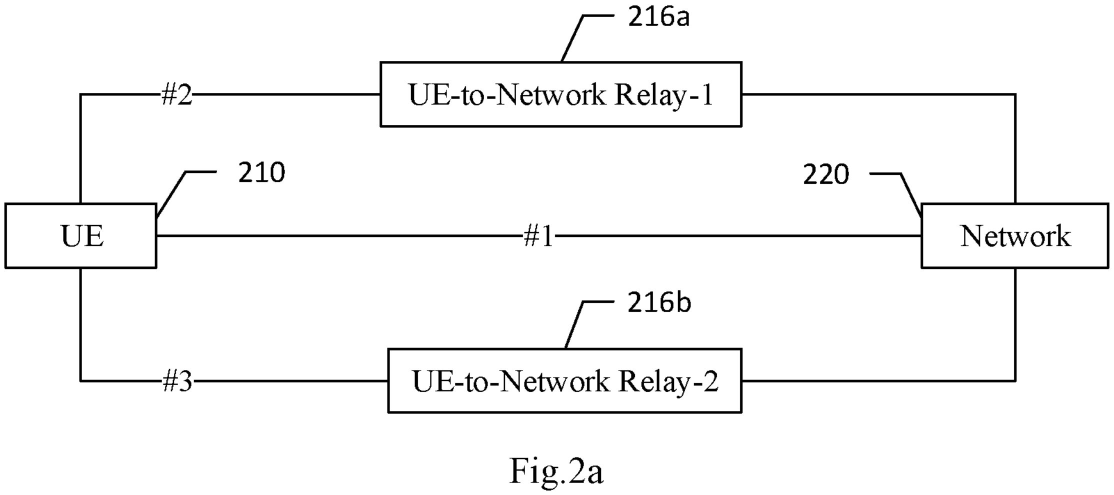
FIGS. 2*a*-2*b* illustrates a scenario where embodiments of the present disclosure may apply.
Figure 2B:
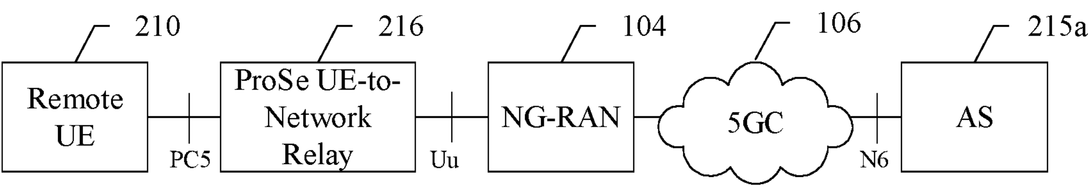

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms “a”, “an” and “the” are intended to include the RECTIFIED SHEET (RULE 91) ISA/CN plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first request and a second request indicate different requests regardless of the order or importance.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a storage device.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein, for example, concepts of UDM, SMF, ProSe Key Management Function (PKMF), etc. are generally understood in the context of 3GPP specifications. Though many embodiments herein are described in the context of Next Generation network (such as 5G mobile networks), other networks may also be applicable.

Even though many embodiments are described in the context of privacy of Proximity-Based Service (ProSe), it is noted that embodiments of the present disclosure are not limited to ProSe, but may also be applicable to other services as appropriate.

Now, detailed embodiments will be described in connection with the 5G network as shown in FIGS. 4, 5*a*, 5*b* and 6. It can be understood that, although the further embodiments herein are described in the context of the 5G network, the embodiments can be also applied to other NFs and/or other mobile communication networks, if the same requirement for privacy protection for a user ID of a remote UE exists in the relay service for the remote UE. It will be also understood that, although specific terms are used in the embodiments, the embodiments are not limited to those specific terms but may be applied to all similar entities. For example, the "User Equipment"/"UE" herein may refer to e.g., user terminal, station, terminal, terminal node, and so on.

In the 5G network, a Subscription Permanent Identifier (SUPI) or a Generic Public Subscription Identifier (GPSI) play the role of user ID.

For the 5G network, there are two security procedures defined for the relay service for a remote UE, which are a security procedure over Control Plane (CP) (which is defined in section 6.3.3.3 of TS33.503 of 3GPP, and is also referred to as a CP based security procedure), a security procedure over User Plane (UP) (which is defined in section 6.6 in TR 23.752 of 3GPP, and section 6.3.3.2 of TS33.503 of 3GPP, and is also referred to as a UP based security procedure).

Figure 4:
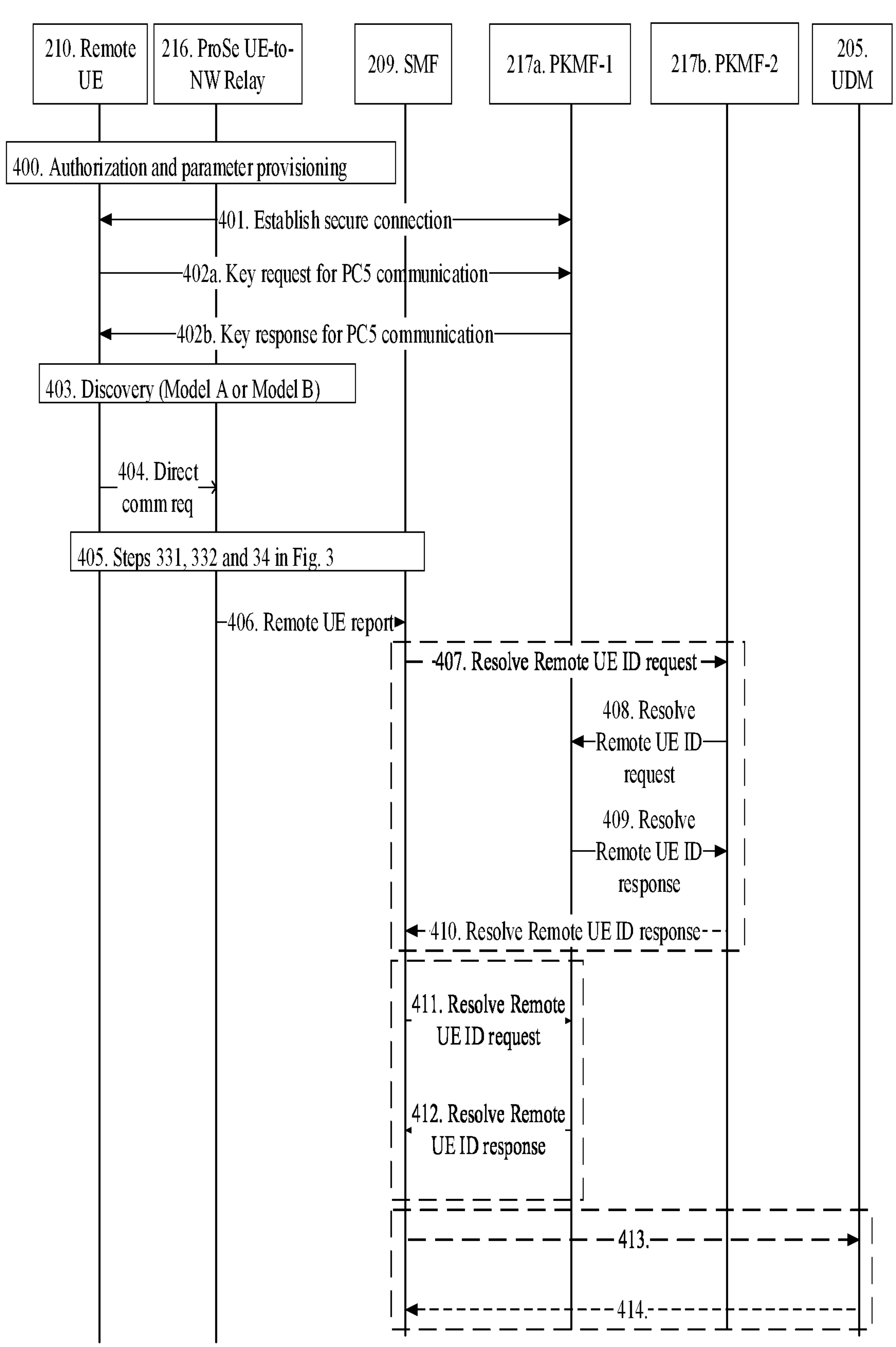
FIG. 4 illustrates a first procedure according to embodiments of the present disclosure.

FIG. 4 illustrates a first procedure according to embodiments of the present disclosure, where the Remote UE 210 has a PKMF-1 in its home PLMN for ProSe key management, and the ProSe UE-to-network relay 216 has a PKMF-2 in its home PLMN for ProSe key management. PKMF-1 217*a* and PKMF-2 217*b* may be located in different PLMNs and can communicate with each other. In case that they are located in the same PLMN, PKMF-1 217*a* and PKMF-2 217*b* are the same PKMF. In FIG. 4, it is assumed that SMF 209 and PKMF-2 217*b* are in the same PLMN, and SMF 209 can access PKMF-2 217*b*. This procedure is a UP based security procedure.

At step 400, the Remote UE 210 retrieves the address of the PKMF-1 (serving the Remote UE 210) 217*a* used for ProSe key management located in its home PLMN, and the UE-to-network Relay 216 retrieves the address of the PKMF-2 (serving the ProSe UE-to-network Relay 216) used for ProSe key management located in its home PLMN.

At Step 401, the Remote UE 210 establishes a secure connection with the PKMF-1 217*a*.

At Step 402*a*, the Remote UE 210 initiates a Key Request message for PC5 communication, the Key Request message comprising a unique identifier of the Remote UE ID, for example SUPI or PEI, etc.

Then PKMF-1 217*a* generates an identifier (referred to as private ID in the context) for the remote UE that will not reveal its original unique identifier (referred to as user ID) but can be mapped to the unique identifier, which may be comprised in a Privacy-Preserved Identity (PPI) for the remote UE. The PPI comprises one or more bits that could be mapped to the unique identifier of the remote UE 210. In a first example, the one or more bits form an encrypted version of the unique identifier of the UE, for example, an encrypted SUPI or an encrypted PEI. In a second example, the one or more bits form a Generic Public Subscription Identifier (GPSI) of the remote UE. In a third example, the one or more bits form a temporary identifier that is mapped to the unique identifier of the UE. In the first example, PKMF-1 keeps the way to encrypt and decrypt, i.e., PKMF-1 knows how the one or more bits in the PPI are mapped (or resolved) to the unique identifier of the remote UE. That is to say, PKMF-1 can provide a mapping between the one or more bits and remote UE's unique identifier. In the latter two examples, PKMF-1 keeps a mapping between the one or more bits and remote UE's unique identifier. PKMF-1 includes the PPI in the Key Response message for PC5 communication sent at Step 402*b* to the Remote UE 210.

Alternatively or additionally, PKMF-1 can also provide a seed (which is used in a hash function) in the Key Response message for PC5 communication to the remote UE.

PKMF-1 maintains a mapping between the seed and the remote UE's unique identifier. The purpose of the seed will be described later below.

At step 403, the ProSe UE-to-network relay 216 discovery is taken place on PC5 interface using either model A or model B discovery as described in 3GPP 23.752 V 17.0.0.

At step 404, the Remote UE 210 sends a Direct Communication Request on PC5 interface. The Remote UE 210 includes at least the PPI, and alternatively or additionally information for finding PKMF-1 in the Direct Communication Request. The information for finding PKMF-1 comprises for example address of the PKMF-1 or its HPLMN ID.

Alternatively or additionally, the remote UE 210 can further provide a Hash in the Direct Communication Request. The Hash is calculated using a one-way hash function with the following parameters: PPI, HPLMN ID of the ProSe UE-to-network relay 216, and the seed sent at step 402*b*.

Figure 3:
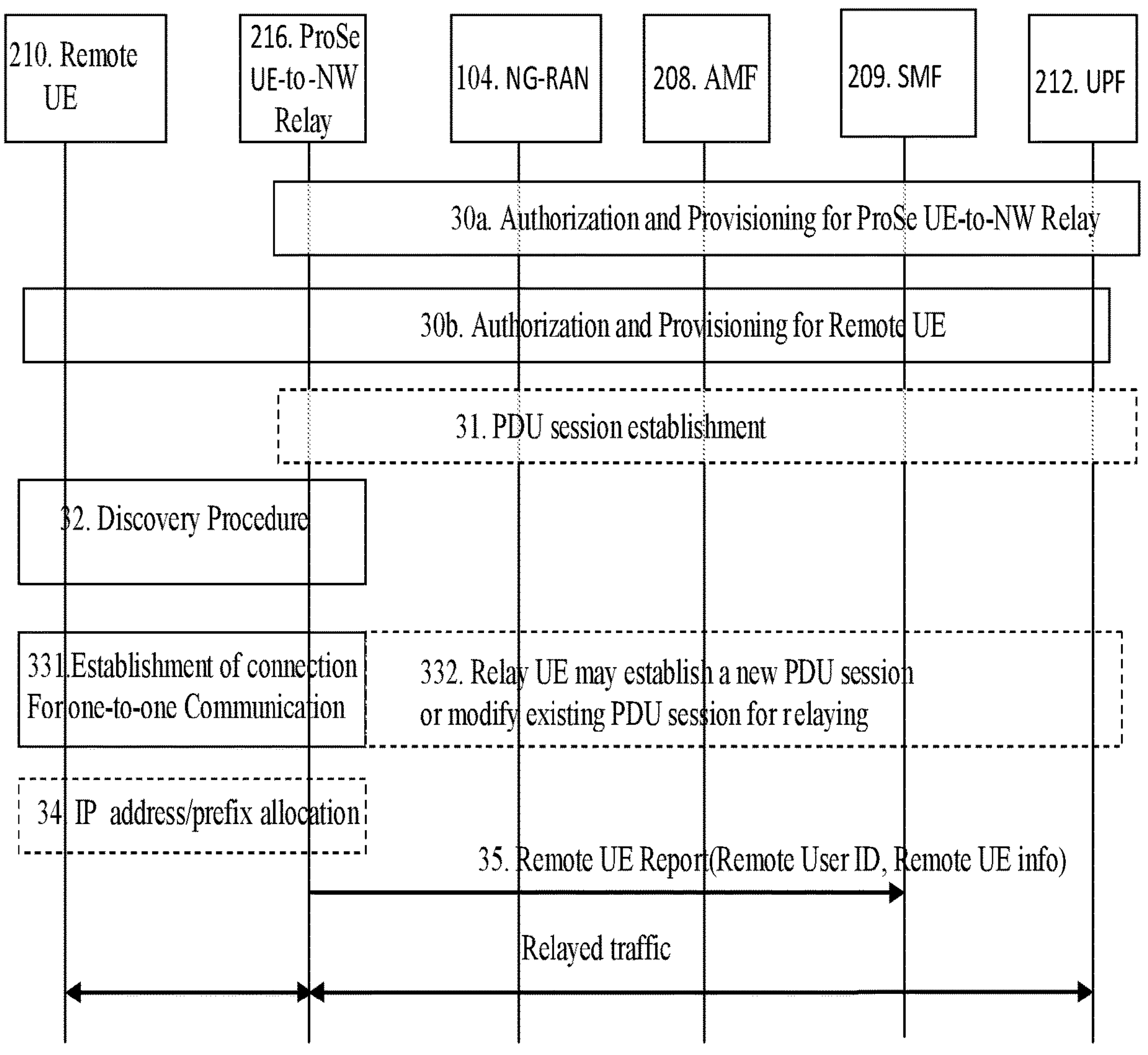
FIG. 3 illustrates a first procedure of how the ProSe 5G UE-to-Network Relay works.

At step 405, steps 331, 332 and 34 of FIG. 3 are performed and will not be reiterated here.

At step 406, the ProSe UE-to-network Relay 216 sends a Remote UE report to the SMF 209 including at least the PPI of the remote UE and alternatively or additionally the information for finding PKMF-1. If the address of PKMF-1 is not available, then the HPLMN ID of the remote UE 210 may be applied for indirectly locating PKMF-1. Alternatively or additionally, the Hash sent in the Direct Communication Request is also comprised in the Remote UE report.

In a first embodiment, at step 407, the SMF 209 may send a request (for example named as Resolve Remote UE ID request) for the unique identifier of the Remote UE 210 to PKMF-2 in the same PLMN of the SMF 209 for assistance, for example in a scenario that SMF 209 does not get the address of PKMF-1 from the Remote UE report sent in step 406, or the SMF 209 cannot access PKMF-1 due to any reason, or for example for no reason. The request comprises at least the PPI of the remote UE and the information for finding PKMF-1, such as HPLMN ID of the remote UE 210 or address of PKMF-1, and may alternatively or additionally comprise the Hash obtained from the Remote UE report.

If the information for finding PKMF-1 is not the address of PKMF-1 but HPLMN ID of the remote UE 210, then according to the HPLMN ID of the remote UE, PKMF-2 217*b* can determine which PKMF it needs to contact, i.e. PKMF-1 217*a*. PKMF-2 217*b* sends at step 408 a request (for example named as Resolve Remote UE ID request) for the unique identifier of the Remote UE 210 to PKMF-1. The request comprises at least the PPI of the remote UE 210, and may alternatively or additionally comprise the Hash sent from SMF 209.

Then PKMF-1 resolves the PPI and gives the unique identifier of the remote UE 210 back to PKMF-2 in a response message (for example named as Resolve Remote UE ID response) at step 409.

Then in turn PKMF-2 sends a response message (for example named as Resolve Remote UE ID response) comprising the unique identifier of the remote UE 210 obtained from PKMF-1 to SMF 209 at step 410.

In a second embodiment, if the SMF 209 knows the address of PKMF-1 217*a* and have access to it, the SMF 209 may send a request (for example named as Resolve Remote UE ID request) for the unique identifier of the Remote UE 210 directly to PKMF-1 at step 411. The request comprises at least the PPI of the remote UE, and may alternatively or additionally comprise the Hash obtained from the Remote UE report.

Then PKMF-1 resolves the PPI and gives the unique identifier of the remote UE 210 back to PKMF-1 in a response message (for example named as Resolve Remote UE ID response) at step 412.

It is noted that if in the above two embodiments, the PKMF-1 does not have the mapping between the PPI and the unique identifier, it may contact another entity to resolve the PPI (not shown), For example, the PPI is GPSI, and PKMF-1 217*a* does not have the mapping between GPSI and SUPI (or PEI), then it may contact UDM in the remote UE's HPLMN to get the SUPI of the remote UE 210 using Nudm_SDM_Get service described in TS 23.502 v17.0.0. As is known in the art that PKMF has access to the UDM of the same PLMN.

It is also noted that in the above two embodiments, in case that the Hash is available to PKMF-1, before PKMF-1 gives the unique identifier back to PKMF-2 or SMF, it may verify the Hash obtained in step 408 or step 411. PKMF-1 will redo the Hash using PPI of the remote UE 210, the seed mapped to the remote UE 210, and the HPLMN ID of PKMF-2. If the Hash obtained in step 408 or step 411 is the same as the one redone by PKMF-1 itself, then PKMF-1 can be sure that the remote UE 210 is indeed attached to the ProSe UE-to-Network relay UE 216.

The term "attached" used herein refers to a status that the relay entity such as the ProSe UE-to-Network relay UE 216 is in connectivity with the UE which support traffic relay between the UE and the network.

In a third embodiment, if SMF 209 knows an entity other than PKMF-1 that has a mapping between the PPI and the unique identifier, the SMF 209 may contact the entity for the unique identifier. For example, the PPI is GPSI, then SMF may directly contact the UDM of the remote UE's HPLMN and gets SUPI of the remote UE by using Nudm_SDM_Get service described in TS 23.502 v17.0.0. In this embodiment, the information for finding PKMF-1 is not necessary in steps 404 and 406.

As is known in the art, SMF can obtain the address of UDM (be it in the same or different PLMN of the SMF) from an entity in the 5GC.

In the Nudm_SDM_Get service, the GPSI of the remote UE is a parameter sent to UDM, the UDM then provides a Nudm_SDM_Get response comprising SUPI corresponding to the GPSI.

By using GPSI, the relay entity may access the UDM directly for the unique identifier such as SUPI of the UE, and solution efficiency may be achieved.

It may be understood that PKMF-1 is not necessarily the only place that provides the mapping between the PPI and the unique identifier of the remote UE 210, and is not necessarily the only entity that the remote UE will turn to for the mapping, a skilled person will understand that the related entities will know how to obtain the mapping directly or indirectly. It is noted that SMF 209 will determine which entity to turn to based on the Remote UE report as appropriate. For example, if the PPI is GPSI, then SMF 209 may choose from either PKMF or UDM to turn to.

Figure 5A:
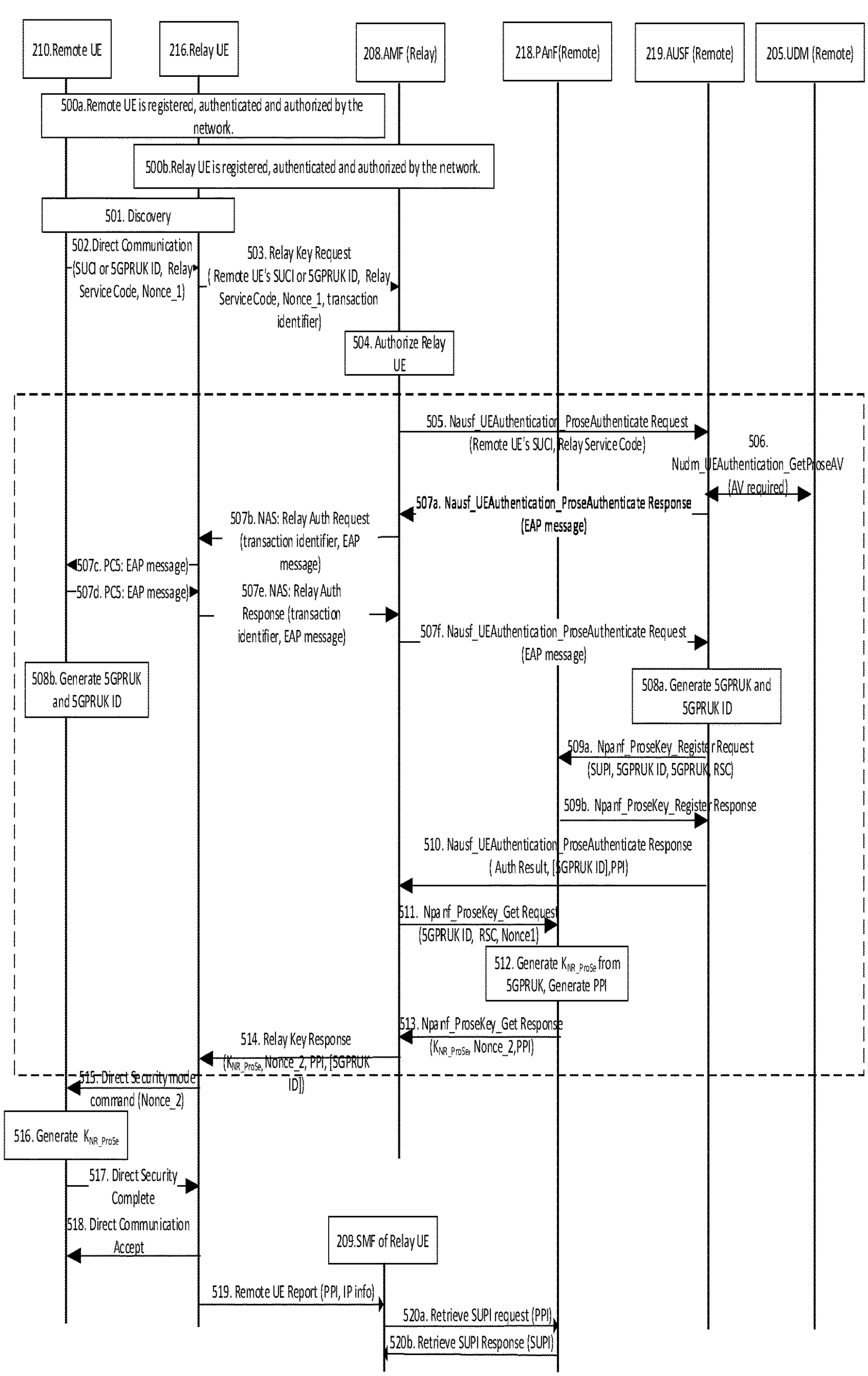
FIG. 5*a* illustrates a second procedure according to embodiments of the present disclosure.

FIG. 5*a* illustrates a second procedure according to embodiments of the present disclosure. In FIG. 5*a*, it is assumed that Remote UE (5G ProSe Remote UE) 210, SMF 209, PAnF 218, AUSF 219, and UDM 205 are in a same PLMN, and Relay UE (5G ProSe UE-to-Network Relay) 216 and AMF 208 are in a same PLMN. This procedure is a CP based security procedure. Steps 512, 513, 514, 519, 520*a* and 520*b* in the figure and the following description about the figure highlights the further embodiments of the methods of the present disclosure.

At steps 500*a*-500*b*: the Remote UE 210 and the Relay UE 216 shall be registered with the network. The Relay UE 216 shall be authenticated and authorized by the network to provide UE-to-Network relay service. The Remote UE 210 shall be authenticated and authorized by the network to receive UE-to-Network relay service. PC5 security policies are provisioned to the Remote UE 210 and the Relay UE 216 respectively during this authorization and information provisioning procedure.

At step 501: the Remote UE 210 shall initiate discovery procedure using any of Model A or Model B method as specified in clause 6.3.1.2 or 6.3.1.3 of TS 23.304 of 3GPP respectively.

At step 502: after the discovery of the Relay UE 216, the Remote UE 210 shall send a Direct Communication Request to the Relay UE 216 for establishing secure PC5 unicast link. The Remote UE 210 shall include its security capabilities and PC5 security signaling policy in the DCR message as specified in TS 33.536 of 3GPP. The message shall also include Relay Service Code and Nonce_1.

If the Remote UE 210 does not have a valid 5GPRUK, the Remote UE 210 shall include SUCI in the DCR to trigger 5G ProSe Remote UE specific authentication and establish a 5GPRUK.

If the Remote UE 210 already has a valid 5GPRUK, the Remote UE 210 shall include the 5GPRUK ID in the DCR to indicate that the Remote UE 210 wants to get relay connectivity using the 5GPRUK.

At step 503: upon receiving the DCR message, the Relay UE 216 shall send the Relay Key Request to the AMF 208 of the Relay UE 216, including SUCI or 5GPRUK ID, RSC and Nonce_1 received in the DCR message. The Relay UE 216 shall also include in the message a transaction identifier that identifies the Remote UE 210 for the subsequent messages over Relay UE's NAS messages and PC5 messages.

At step 504: the AMF 208 of the Relay UE 216 shall verify whether the Relay UE 216 is authorized to provide the UE-to-Network relay service.

If 5GPRUK ID is received from the Relay UE 216, the AMF 208 of the Relay UE 216 selects the ProSe Anchor Function (PAnF 218) of the Remote UE 210 based on 5GPRUK ID and skips the steps 505-510.

At step 505: the AMF 208 of the Relay UE 216 shall select an AUSF based on SUCI and forward the parameters received in Relay Key Request to the AUSF 219 in Nausf_UEAuthentication_ProseAuthenticate Request message which shall contain the Remote UE's SUCI, Relay Service Code.

At step 506: the AUSF 219 shall initiate a 5G ProSe Remote UE specific authentication using the ProSe specific parameters received (i.e., RSC, etc.). The serving network name handling is same as defined in TS 33.501 of 3GPP. The security policy negotiation and protection of messages hereafter shall follow the one-to-one security establishment.

The AUSF 219 of the Remote UE 210 shall retrieve the Authentication Vectors from the UDM 205 via Nudm UEAuthentication_GetProseAv Request message and trigger authentication of the Remote UE 210. This authentication is performed between the AUSF 219 of the Remote UE 210 and the Remote UE 210 via the AMF 208 of the Relay UE 216 and the Relay UE 216. Based on SUPI, the UDM 205 shall choose the authentication method.

At step 507*a*: if EAP-AKA' is selected by UDM 205, the AUSF 219 of the Remote UE 210 shall trigger authentication of the Remote UE 210 based on EAP-AKA'. The AUSF 219 of the Remote UE 210 generates the EAP-Request/AKA'-Challenge message defined in clause 6.1.3.1 of TS 33.501 of 3GPP and send EAP-Request/AKA'-Challenge message to the AMF 208 of the UE 216 in a Relay Nausf_UEAuthentication_ProseAuthenticate Response message.

At step 507*b*: the AMF 208 of the Relay UE 216 shall forward the Relay Authentication Request (including the EAP-Request/AKA'-Challenge) to the Relay UE 216 over NAS message, including transaction identifier of the Remote UE 210 in the message. The NAS message is protected using the NAS security context created for the Relay UE 216.

At step 507*c*: based on the transaction identifier, the Relay UE 216 shall forwards the EAP-Request/AKA'-Challenge to the Remote UE 210 over PC5 messages.

The USIM in the Remote UE 210 verifies the freshness of the received values by checking whether AUTN can be accepted as described in TS 33.102 of 3GPP.

For EAP-AKA', the USIM computes a response RES. The USIM shall return RES, CK, IK to the ME. The ME shall derive CK' and IK' according to Annex A.3 in TS 33.501 of 3GPP.

At step 507*d*: the Remote UE 210 shall return EAP-Response/AKA'-Challenge to the Relay UE 216 over PC5 messages.

At step 507*e*: the Relay UE 216 forwards the EAP-Response/AKA'-Challenge together with the transaction identifier of the Remote UE 210 to the AMF 208 of the Relay UE 216 in a NAS message Relay Authentication Response.

At step 507*f*: the AMF 208 of the Relay UE 216 forwards EAP-Response/AKA'-Challenge to the AUSF 219 of the Remote UE 210 via Nausf_UEAuthentication_ProseAuthenticate Request.

The AUSF 219 of the Remote UE 210 performs the UE authentication by verifying the received information as described in TS33.501 of 3GPP.

For EAP-AKA', the AUSF 219 of the Remote UE 210 and the Remote UE 210 may exchange EAP-Request/AKA'-Notification and EAP-Response/AKA'-Notification messages via the AMF 208 of the Relay UE 216. After the exchanges, the AUSF 219 of the Remote UE 210 derives KAUSF_P without calculating the KSEAF.

The AUSF 219 of the Remote UE 210 and the Remote UE 210 shall derive a new $K_{AUSF\_P}$ (different from $K_{AUSF}$). NAS SMC procedure is not performed between Remote UE 210 and AMF 208 of the Relay UE 216.

At step 508: on successful authentication, the AUSF 219 of the Remote UE 210 and the Remote UE 210 shall generate 5GPRUK and 5GPRUK ID using the newly derived $K_{AUSF\_P}$.

At step 509*a*: the AUSF 219 of the Remote UE 210 shall select the PAnF 218 and send the SUPI, 5GPRUK, 5GPRUK ID, and RSC in Npanf_ProseKey_Register Request message to the PAnF 218.

At step 509*b*: the PAnF 218 shall store the Prose context info (i.e., SUPI, 5GPRUK, 5GPRUK ID, RSC) for the Remote UE 210 and send Npanf_ProseKey_Register Response message to the AUSF 219.

At step 510: the AUSF 219 of the Remote UE 210 shall send the Authentication result, 5GPRUK ID if the authentication is successful in Nausf_UEAuthentication_ProseAuthenticate Response message to the AMF 208 of the Relay UE 216.

At step 511: the AMF 208 of the Relay UE 216 shall select the PAnF 218 of the Remote UE 210, based on 5GPRUK ID and forwards the 5GPRUK ID, Nonce_1 and RSC in the Relay Key Request to the PAnF 218 of the Remote UE 210 in Npanf_ProseKey_Get Request message.

At step 512: when 5GPRUK ID, Nonce_1 and RSC are received from the AMF 208 of the Relay UE 216, the PAnF 218 of the Remote UE 210 discovers the 5G PRUK stored locally for the Remote UE 210. The PAnF 218 of the Remote UE 210 shall generate Nonce_2 and the $K_{NR\_Prose}$ key. The PAnF 218 generates a PPI as described above with reference to FIG. 4. In an embodiment, the unique identifier of the remote UE that is mapped to from the PPI comprises a ProSe Relay User Key (PRUK) ID, or a Subscription Concealed Identifier (SUCI) of the remote UE. In an embodiment, the PPI further comprises contact information to enable discovery of the PAnF 218, such as a Public Land Mobile Network (PLMN) ID, Routing Indicator of the PAnF 218, etc. In an embodiment, the contact information may also indicate type of the NF that generates the PPI, i.e., PAnF 218 in this case.

At step 513: the PAnF 218 of the Remote UE 210 shall send the $K_{NR\_ProSe}$ key and Nonce_2, together with the PPI, in Npanf_ProseKey_Get Response message to the AMF 208 of the Relay UE 216.

At step 514: when receiving a $K_{NR\_ProSe}$ from the PAnF 218 of the Remote UE 210, the AMF 208 of the Relay UE 216 shall not attempt to trigger NAS SMC procedure with the Remote UE 210. The AMF 208 of the Relay UE 216 shall send $K_{NR\_ProSe}$, Nonce_2, and the PPI in Relay Key Response to the Relay UE 216. The AMF 208 of the Relay UE 216 shall also include the 5GPRUK ID in the message if received from the AUSF 219 of the Remote UE 210.

At step 515: the Relay UE 216 derives PC5 session key $K_{relay\text{-}sess}$ and confidentiality and integrity keys from $K_{NR\_ProSe}$. $K_{NR\_ProSe}$ ID and $K_{relay\text{-}sess}$ ID are established in the same way as $K_{NRP\ ID}$) and $K_{NRP\text{-}sess}$ ID in TS 33.536 of 3GPP. The Relay UE 216 shall send the received Nonce_2 to the Remote UE 210 in Direct Security mode command message, which is protected using $K_{relay\text{-}int}$ or/and $K_{relay\text{-}enc}$ derived from $K_{relay\text{-}sess}$ according to the negotiated PC5 signaling policies between the Remote UE 210 and the Relay UE 216.

At step 516: the Remote UE 210 shall generate the $K_{NR\_ProSe}$ key to be used for Remote access via the Relay UE 216 in the same way as defined in step 512. The Remote UE 210 shall derive PC5 session key $K_{relay\text{-}sess}$ and confidentiality and integrity keys from $K_{NR\_ProSe}$ the same way as defined in step 515.

At step 517: the Remote UE 210 shall send the Direct Security Mode Complete message containing its PC5 user plane security policies to the Relay UE 216, which is protected by $K_{relay\text{-}int}$ or/and $K_{relay\text{-}enc}$ derived from $K_{relay\text{-}sess}$ according to the negotiated PC5 signaling policies between the Remote UE 210 and the Relay UE 216.

At step 518: after the successful verification of the Direct Security Mode complete message, the Relay UE 216 responds a Direct Communication Accept message to the Remote UE 210 to finish the PC5 connection establishment procedures and store the 5GPRUK ID in the security context associated to the PC5 link with the Remote UE 210.

Further communication between the Remote UE 210 and the Network takes place securely via the Relay UE 216.

At step 519: the 5G ProSe Layer-3 UE-to-Network Relay shall send a Remote UE Report (Remote User ID, IP info) message to the SMF 209 for the PDU Session associated with the relay. The PPI that the Relay UE 216 received in step 514 is used as the Remote User ID. The IP info refers to the Remote UE's IP info.

At step 520*a*: if the user ID is not available in SMF 209, the SMF209 shall discover the PAnF based on the contact information in the PPI and sends a Resolve Remote UE ID request towards the PAnF 218 in Npanf_RemoteUEId_Get Request message, including private ID in the PPI or the PPI of the Remote UE in the message.

The PAnF 218 shall verify the private ID is valid and the SMF 209 is authorized to get the UE ID of remote UE, e.g. SUPI (or GPSI). If verified, the PAnF 218 shall resolve the private ID into the user ID At step 520*b*: the PAnF 218 shall send e.g. a Resolve Remote UE ID response back to the SMF 209 in e.g. Npanf_RemoteUEId_Get Response message, including user ID e.g. SUPI, GPSI, etc. of the Remote UE in the message.

The SMF 209 could store the user ID of the remote UE 210 and uses it in the subsequent procedure, e.g. fetching the subscription data of the remote UE 210, reporting the relay traffic usage of the Remote UE 210, triggering secondary authentication or authorization of the Remote UE 210.

Figure 5B:
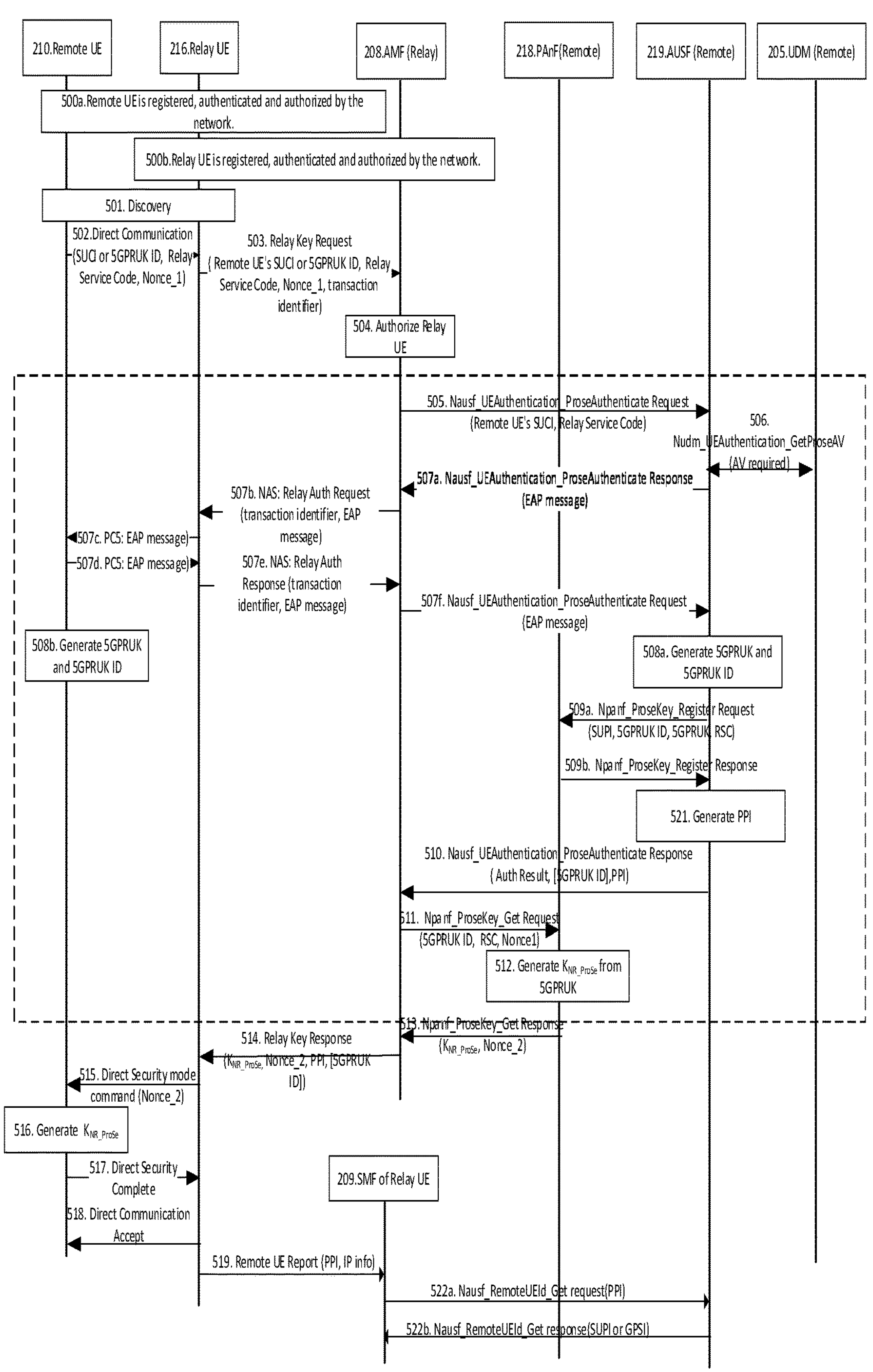
FIG. 5*b* illustrates a third procedure according to embodiments of the present disclosure.

In an alternative embodiment used in the CP based security procedure as shown in FIG. 5*b*, it is the AUSF 219 of the remote UE, instead of the PAnF 218 of the remote UE, that provides PPI. What is different from FIG. 5*a* is that steps 521, 522*a*, 522*b* are added and steps 520*a* and 520*b* are cancelled. In step 521, the AUSF 219 generates the PPI, then if the authentication of the remote UE is successful, the AUSF 219 shall generate the PPI in step 521 and send the PPI to the AMF 208 in the authentication result in step 510. The contact information in the PPI may also indicate the NF type of the NF that generates the PPI, i.e., AUSF 219 in this case. Steps 512 and 513 should be adapted to remove PPI related actions and information. In steps 522*a* and 522*b* of FIG. 5*b*, the SMF 209 shall contact the AUSF 219 based on the contact information in the PPI, and asks the AUSF 219 to resolve the private ID in the PPI into the user ID, e.g., a SUPI (or GPSI), based on the private ID in the PPI, with the corresponding Nausf messages, e.g. Nausf_RemoteUEId_Get request/response.

Figure 6:
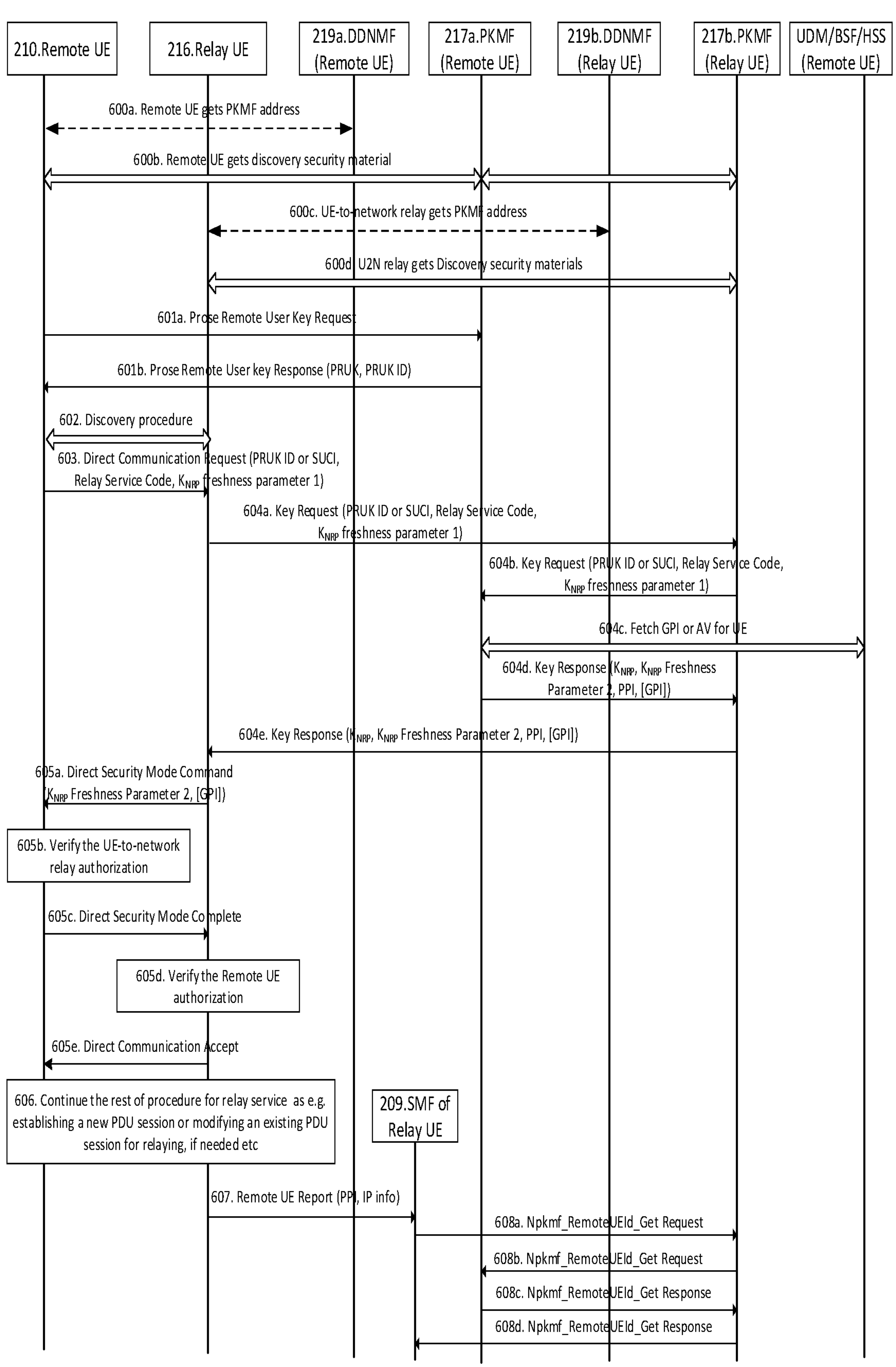
FIG. 6 illustrates a fourth procedure according to embodiments of the present disclosure.

FIG. 6 illustrates a fourth procedure according to embodiments of the present disclosure. In FIG. 6, it is assumed that Remote UE (5G ProSe Remote UE) 210, SMF 209, PKMF 217*a*, DDNMF219*a* and UDM/BSF/HSS are in a same PLMN, and Relay UE (5G ProSe UE-to-Network Relay) 216, DDNMF 219*b* and PKMF 217*b* are in a same PLMN. This procedure is a UP based security procedure. Steps 604*d*, 604*e*, 607, 608*a-d* in the figure and the following description about the figure highlights the further embodiments of the methods of the present disclosure.

At step 600*a*: The Remote UE 210 gets the 5G PKMF address from the 5G DDNMF of its HPLMN. Alternatively, the Remote UE 210 may be provisioned with the 5G PKMF address by PCF. If the Remote UE 210 is provisioned with the 5G PKMF address, the Remote UE 210 may access the 5G PKMF directly without requesting it to the 5G DDNMF. In case that the Remote UE 210 cannot access the 5G PKMF using the provisioned 5G PKMF address, the Remote UE 210 may request the 5G PMKF address to the 5G DDNMF.

At step 600*b*: The Remote UE 210 shall establish a secure connection with the 5G PKMF via PC8 reference point. Security for PC8 interface relies on Ua security if GBA specified in TS 33.220 of 3GPP is used or Ua* security if AKMA specified in TS 33.535 of 3GPP is used. The 5G PKMF of the Remote UE 210 shall check whether the Remote UE 210 is authorized to receive UE-to-Network relay service and if the UE is authorized, the 5G PKMF of the Remote UE 210 provides the discovery security materials to the Remote UE 210. The 5G PKMF of the Remote UE 210 shall request the discovery security materials to the 5G PKMFs of the potential Relay UE 216 UEs from which the Remote UE 210 gets the relay services, if the Remote UE 210 provided the list of the visited networks. The 5G PKMF of the Relay UE 216 may include the PC5 security policies to be provided to the Remote UE 210.

At step 600*c*: The Relay UE 216 gets the 5G PKMF address from its HPLMN in the same way as described in step 0a.

At step 600d: The Relay UE 216 shall establish a secure connection with the 5G PKMF via PC8 reference point as in step 600b. The 5G PKMF of the Relay UE 216 shall check whether the Relay UE 216 is authorized to provide Relay UE 216 service and if authorized, the 5G PKMF of the Relay UE 216 provides the discovery security materials to the Relay UE 216. The 5G PKMF of the Relay UE 216 may include the PC5 security policies to the Relay UE 216.

At step 601a: The Remote UE 210 sends a PRUK Request message to its 5G PKMF. The message indicates that the Remote UE 210 is requesting a PRUK from the 5G PKMF. If the Remote UE 210 already has a PRUK from this 5G PKMF, the message shall also contain the PRUK ID of the PRUK.

PRUK ID shall take the form of either the NAI format or the 64-bit string.

At step 601b: The 5G PKMF checks that the Remote UE 210 is authorised to receive UE-to-Network relay services. This is done by using the Remote UE 210's identity associated with the key used to establish the secure connection between the Remote UE 210 and 5G PKMF in step 600b. If the Remote UE 210 is authorised to receive the service, the 5G PKMF sends a PRUK and PRUK ID to the Remote UE 210. If a PRUK and PRUK ID are included, the Remote UE 210 shall store these and delete any previously stored ones for this 5G PKMF.

At step 602: The discovery procedure is performed between the Remote UE 210 and the Relay UE 216 using the discovery parameters and discovery security material.

At step 603: The Remote UE 210 sends a Direct Communication Request (DCR) that contains the PRUK ID or a SUCI if the Remote UE does not have a valid PRUK, Relay Service Code (RSC) of the Relay UE 216 service and KNRP freshness parameter 1 to the Relay UE 216. If PRUK ID does not contain the HPLMN ID of the 5G ProSe Remote UE 210 or the routing information to the 5G PKMF of the Remote UE 210 (e.g., realm part when the NAI format of PRUK ID is used), the DCR message shall include the HPLMN ID of the Remote UE 210. The PC5 security establishment procedure between the Remote UE 210 and the Relay UE 216 including security parameters and security policy negotiation and protection of messages hereafter shall follow the one-to-one security establishment.

At step 604a: The Relay UE 216 sends a Key Request message that contains PRUK ID or SUCI, RSC and KNRP freshness parameter 1 to its 5G PKMF. The Key Request message shall also include the HPLMN ID of the Remote UE 210 if it is included in the DCR.

At step 604b: On receiving the Key Request message, the 5G PKMF of the Relay UE 216 shall check if the Relay UE 216 is authorized to provide relay service to the Remote UE 210 based on the Relay UE 216's identity associated with the key used to establish the secure PC8 connection and the received RSC. If the Relay UE 216's authorization information is not locally available, the 5G PKMF shall request the authorization information to the UDM 205 of the Relay UE 216 (not shown in the figure). If the Relay UE 216 is authorized to provide the relay service based on ProSe Subscription data as specified in TS 23.502 of 3GPP, the 5G PKMF of the Relay UE 216 sends the Key Request with the PRUK ID or the SUCI to the 5G PKMF of the Remote UE 210. The 5G PKMF of the Relay UE 216 identifies the 5G PKMF address of the Remote UE 210 based on the PRUK ID or HPLMN ID or SUCI of the Remote UE 210 if it is included in the Key Request message.

At step 604c: On receiving the Key Request message from the 5G PKMF of the Relay UE 216, the 5G PKMF of the Remote UE 210 shall check if the Remote UE 210 is authorized to use the relay service. The relay service authorization check shall be based on the PRUK ID and RSC included in the Key Request message or the SUPI of the Remote UE and the RSC included in the Key Request message. If a SUCI is included in the Key Request message, the 5G PKMF of the Remote UE 210 shall request the UDM 205 of the Remote UE 210 to de-conceal the SUCI to gain the SUPI. If the Remote UE 210's authorization information is not locally available, the 5G PKMF shall request the authorization information to the UDM 205 of the Remote UE 210 (not shown in the figure).

If a new PRUK is required, the 5G PKMF shall perform the one of the following procedures (as shown in the step 604c in the figure):

- If the 5G PKMF of the Remote UE 210 supports the Zpn interface to the BSF of the Remote UE 210, the 5G PKMF of the Remote UE 210 may request a GBA Push Info (GPI—see TS 33.223 of 3GPP) for the Remote UE 210 from the BSF. When requesting the GPI, the 5G PKMF shall include a PRUK ID in the P-TID field. On receiving the GPI, the 5G PKMF shall use $K_{s(\_ext)\_NAF}$ as the PRUK.
- If the 5G PKMF supports the SBI interface to the BSF of the Remote UE 210, the 5G PKMF may request the GPI via SBI interface as described in TS 33.223 of 3GPP. On receiving the GPI, the 5G PKMF shall use $K_{s(\_ext)\_NAF}$ as the PRUK.
- If the 5G PKMF of the Remote UE 210 supports the PC4a interface to the HSS of the UE, then the 5G PKMF of Remote UE 210 may request a GBA Authentication Vector (AV) for the Remote UE 210 from the HSS. On receiving the AV, the 5G PKMF locally forms the GPI including a PRUK ID in the P-TID field. The 5G PKMF shall use $K_{s(\_ext)\_NAF}$ as the PRUK.
- If the 5G PKMF is co-located or integrated with BSF functionality and supports the SBI interface to the UDM 205/HSS of the Remote UE 210, the 5G PKMF may request the GBA AV via SBI interface as described in TS 33.220 of 3GPP. On receiving the AV, the 5G PKMF locally forms the GPI including a PRUK ID in the P-TID field. The 5G PKMF shall use $K_{s(\_ext)\_NAF}$ as the PRUK.

At step 604d: The 5G PKMF of the Remote UE 210 shall generate KNRP freshness parameter 2 and derive KNRP using the PRUK identified by PRUK ID, RSC, $K_{NRP}$ freshness parameter 1 and $K_{NRP}$ freshness parameter 2. Then, the 5G PKMF of the Remote UE 210 sends a Key Response message that contains $K_{NRP}$ and $K_{NRP}$ freshness parameter 2 and the PC5 security policies of the relay service to the 5G PKMF of the Relay UE 216. This message shall include GPI if generated.

The PKMF 217*b* of the remote UE shall generate a PPI of remote UE, The PPI has been described above with reference to FIG. 4. In an embodiment, the PPI further comprises contact information to enable discovery of the PKMF 217*a* of Remote UE, such as a Public Land Mobile Network (PLMN) ID of the remote UE, Routing Indicator of the PKMF 217*a*, etc. In an embodiment, the contact information may also indicate type of the NF that generates the PPI, i.e., PKMF 217*a* in this case.

At step 604e: The 5G PKMF of the Relay UE 216 sends the Key Response message to the Relay UE 216, which includes the PC5 security policies of the relay service, and the PPI.

At step 605a: The Relay UE 216 shall derive the session key ($K_{NRP-SESS}$) from $K_{NRP}$ and then derive the confidentiality key (NRPEK) (if applicable) and integrity key (NRPIK) based on the PC5 security policies as specified in TS 33.536 of 3GPP. The Relay UE 216 sends a Direct Security Mode Command message to the Remote UE 210. This message shall include the $K_{NRP}$ Freshness Parameter 2 and the PC5 security policies, and shall be protected as specified in TS 33.536 of 3GPP.

At step 605b: If the Remote UE 210 receives the message containing the GPI, it processes the GPI as described in TS 33.223 of 3GPP. The Remote UE 210 shall derive the PRUK and obtain the PRUK ID from the GPI.

The Remote UE 210 shall derive $K_{NRP}$ from its PRUK, RSC, $K_{NRP}$ Freshness Parameter 1 and the received $K_{NRP}$ Freshness Parameter 2. It shall then derive the session key ($K_{NRP-SESS}$) and the confidentiality key (NRPEK) (if applicable) and integrity key (NRPIK) based on the PC5 security policies in the same manner as the Relay UE 216 and process the Direct Security Mode Command. Successful verification of the Direct Security Mode Command assures the Remote UE 210 that the Relay UE 216 is authorized to provide the relay service.

Handling of synchronization failure when UE processes the authentication challenge in the GPI is performed similarly to clause 6.7.3.2.1.2 in TS 33.303 of 3GPP. The Relay UE 216 shall send the key request message to the 5G PKMF of the Remote UE 210 via the 5G PKMF of the Relay UE 216 upon receiving the Direct Security Mode Failure message from the Remote UE 210. The key request message shall include the RAND and AUTS received from the Remote UE 210. The 5G PKMF of the Remote UE 210 shall request GPI as described in step 604c.

At step 605c: The Remote UE 210 responds with a Direct Security Mode Complete message to the Relay UE 216 as specified in TS 33.536 of 3GPP.

At step 605d: On receiving the Direct Security Mode Complete message, the Relay UE 216 shall verify the Direct Security Mode Complete message. Successful verification of the Direct Security Mode Complete message assures the Relay UE 216 that the Remote UE 210 is authorized to get the relay service.

At step 605e: The Relay UE 216 responds a Direct Communication Accept message to the Remote UE 210 after the successful verification to finish the PC5 connection establishment procedures.

At step 606: The Remote UE 210 and Relay UE 216 continues the rest of procedure for the relay service over the secure PC5 link.

At step 607: The 5G ProSe Layer-3 UE-to-Network Relay shall send a Remote UE Report (Remote User ID, Remote UE info) message to the SMF 209 for the PDU Session associated with the relay. In this case, the PPI that the Relay UE 216 received in step 604e is used as the Remote User ID.

At step 608a: if the user ID is not available in SMF 209, the SMF209 shall discover the PKMF **217*b* of the relay UE based on the contact information in the PPI and sends a Resolve Remote UE ID request towards the PKMF 217*b*** in Npkmf_RemoteUEId_Get Request message, including private ID in the PPI or the PPI of the Remote UE in the message.

At step 608b: The PKMF of Relay UE 216 shall forward the request to the PKMF **217*a*** of remote UE.

The PKMF**217*a* of remote UE shall verify the PPI is valid and the SMF 209 and/or the PKMF 217*b* of Relay UE 216** is authorized to get the user ID of remote UE, e.g., the SUPI (or GPSI).

If verified, the PKMF **217*a*** of remote UE shall resolve the private ID into the user ID.

At step 608c: The PKMF **217*a* shall send e.g., a Resolve Remote UE ID response back to the SMF 209** in Npkmf_RemoteUEId_Get Response message, including the user ID, e.g., SUPI (or GPSI), of the Remote UE in the message.

At step 608d: The message is sent by the PKMF **217*b* of the Relay UE to the SMF 209**.

The SMF 209 may store the user ID of the remote UE and use it in the subsequent procedure, e.g., fetching the subscription data of the remote UE, reporting the relay traffic usage of the Remote UE, triggering secondary authentication or authorization of the Remote UE.

FIGS. **7*a-d*** illustrate flowcharts of network elements according to embodiments of the present disclosure.

FIG. **7*a* illustrates a flowchart of a method 710** for a relay UE to provide a user ID of a remote UE under privacy protection to a NF in a network according to the present disclosure. The network is a wireless communication network according to embodiments of the present disclosure. The remote UE attaches to a ProSe UE-to-Network relay entity capable of supporting connectivity to the wireless communication network for the UE. The wireless communication network here may be a 5G network, a 5G network in combination with a 4G network, or any other appropriate network.

At step 711, the relay entity obtains contact information of a second NF and a private ID corresponding to the user ID from the second NF, wherein the contact information can be used by the first NF to contact the second NF to resolve the user ID based on the private ID.

At step 712, the relay entity sends the contact information and the private ID to the first NF.

In an example, the contact information further indicates a type of the second NF.

In an example, the private ID is an encrypted version of the user ID or a temporary ID mapping to the user ID.

In an example, step 712 further comprises: sending the contact information and the private ID to the first NF in a report regarding the remote UE.

In an example, the network is a 5G mobile communication network.

In an example, the user ID is a Subscription Permanent Identifier (SUPI) or a Generic Public Subscription Identifier (GPSI) of the remote UE.

In an example, if the method is used in a Control Plane (CP) based security procedure, the first NF is a Session Management Function (SMF) of the relay UE, the second NF is a ProSe Anchor Function (PAnF) of the remote UE, and the relay UE obtains the contact information and the private ID from the PAnF via an Access and Mobility Management Function (AMF) of the relay UE.

In an example, the contact information includes a Public Land Mobile Network (PLMN) ID of the remote UE and Routing Indicator of the PAnF.

In an example, if the method is used in a Control Plane (CP) based security procedure, the first NF is a SMF of the relay UE, the second NF is an Authentication Server Function (AUSF) of the remote UE, and the relay UE obtains the contact information and the private ID from the AUSF via an AMF of the relay UE.

In an example, the contact information includes a PLMN ID of the remote UE and Routing Indicator of the AUSF.

In an example, if the method is used in a User Plane (UP) based security procedure, the first NF is a SMF of the relay UE, the second NF is a ProSe Key Management Function (PKMF) of the remote UE.

In an example, the relay UE obtains the contact information and the private ID from a PKMF of the remote UE via a PKMF of the relay UE.

In an example, the relay UE obtains the contact information and the private ID from a PKMF of the remote UE via the remote UE.

In an example, the contact information includes a PLMN ID of the remote UE and Routing Indicator of the PKMF of the remote UE.

In an example, the SMF of the relay entity contacts the PKMF of the remote UE via a PKMF of the relay UE to resolve the user ID based on the private ID.

In an example, the relay entity further obtains a hash calculated via a hash function from a seed mapped to the user ID distributed from the second NF, for verifying whether the remote UE is attached to the relay UE, and sends the hash to the first NF together with the contact information and the private ID.

Figure 7A:
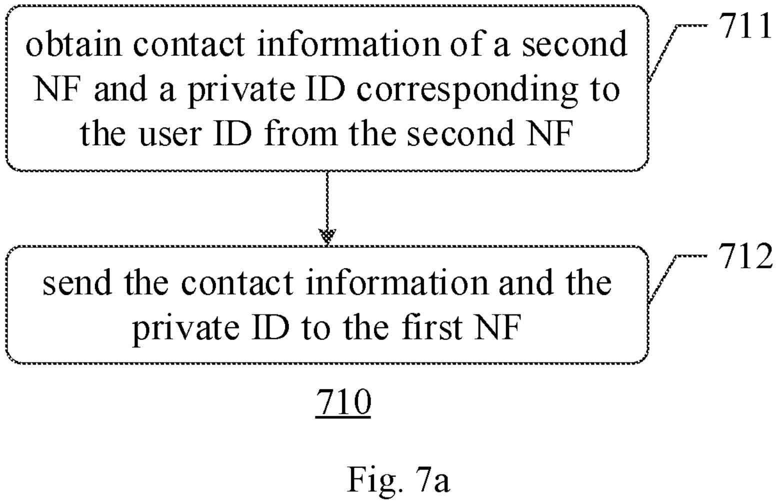
FIGS. 7*a*-7*d* illustrate flowcharts of network elements according to embodiments of the present disclosure.
Figure 7B:
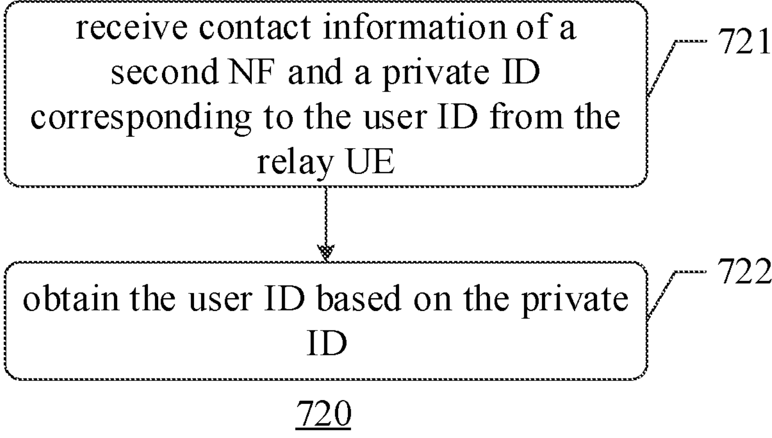

FIG. 7b illustrates a flowchart of a method 720 for a first NF in a network to obtain a user ID of a remote UE under privacy protection according to the present disclosure. The network is a wireless communication network according to embodiments of the present disclosure. The remote UE attaches to a ProSe UE-to-Network relay entity capable of supporting connectivity to the wireless communication network for the UE. The wireless communication network here may be a 5G network, a 5G network in combination with a 4G network, or any other appropriate network.

At step 721, the first NF receives contact information of a second NF and a private ID corresponding to the user ID from the relay entity, wherein the contact information can be used by the first NF to contact the second NF to resolve the user ID based on the private ID At step 722, the first NF obtains the user ID based on the private ID.

In an example, the first NF stores the user ID after obtaining the user ID.

In an example, if the user ID and the private ID had already been stored by the first NF, then the first NF obtains the user ID by retrieving the stored user ID based on the private ID, otherwise the first NF obtains the user ID by contacting the second NF to ask the second NF to resolve the user ID based on the private ID.

In an example, the contact information further indicates a type of the second NF.

In an example, the private ID is an encrypted version of the user ID or a temporary ID mapping to the user ID.

In an example, the receiving contact information of a second NF and a private ID corresponding to the user ID from the relay entity further comprising receiving the contact information and the private ID in a report regarding the remote UE from the relay entity.

In an example, the network is a 5G mobile communication network.

In an example, the user ID is a Subscription Permanent Identifier (SUPI) or a Generic Public Subscription Identifier (GPSI) of the remote UE.

In an example, if the method is used in a Control Plane (CP) based security procedure, the first NF is a Session Management Function (SMF) of the relay entity, the second NF is a ProSe Anchor Function (PAnF) of the remote UE.

In an example, the contact information includes a Public Land Mobile Network (PLMN) ID of the remote UE and Routing Indicator of the PAnF of the remote UE.

In an example, if the method is used in a Control Plane (CP) based security procedure, the first NF is a SMF of the relay entity, the second NF is an Authentication Server Function (AUSF) of the remote UE.

In an example, the contact information includes a PLMN ID of the remote UE and Routing Indicator of the AUSF of the remote UE.

In an example, if the method is used in a User Plane (UP) based security procedure, the first NF is a SMF of the relay entity, the second NF is a ProSe Key Management Function (PKMF) of the remote UE.

In an example, the contact information includes a PLMN ID of the remote UE and Routing Indicator of the PKMF of the remote UE.

In an example, the SMF of the relay entity contacts the PKMF of the remote UE via a PKMF of the relay entity to resolve the user ID based on the private ID In an example, the PKMF of the remote UE further contacts a Unified Data Management entity of the remote UE, or a Unified Repository Management entity of the remote UE to resolve the user ID based on the private ID.

In an example, the first NF further receives a hash calculated via a hash function from a seed mapped to the user ID distributed from the second NF, for verifying whether the remote UE is attached to the relay entity, and sends the hash to the second NF.

In an example, if the method is used in a User Plane (UP) based security procedure and if the user ID is a Generic Public Subscription Identifier (GPSI) of the remote UE, then the first NF is a SMF of the relay entity, the second NF is a Unified Data Management entity of the remote UE or a Unified Repository Management entity of the remote UE.

Figure 7C:
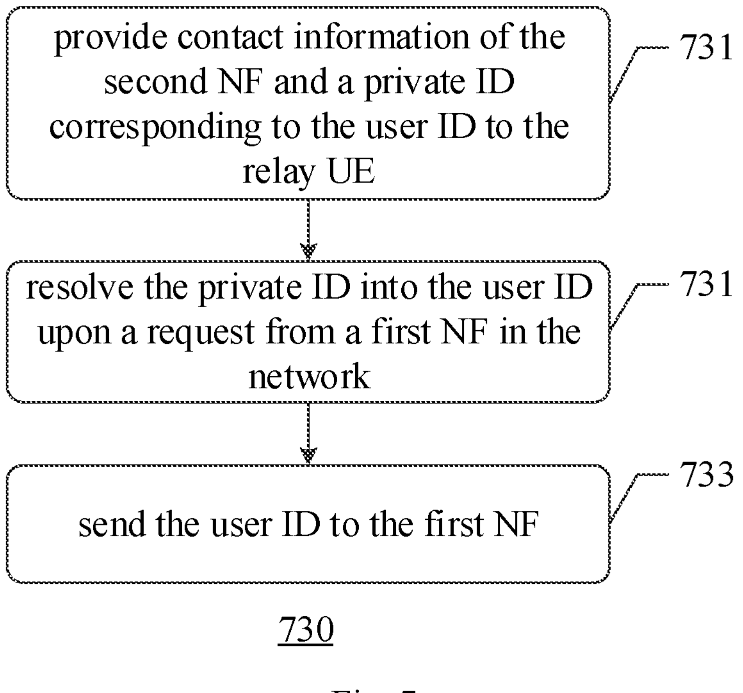

FIG. 7c illustrates a flowchart of a method 730 for a second Network Function (NF) to provide privacy protection for a user ID of a remote User Equipment (UE) according to the present disclosure. The network is a wireless communication network according to embodiments of the present disclosure. The remote UE attaches to a ProSe UE-to-Network relay entity capable of supporting connectivity to the wireless communication network for the UE. The wireless communication network here may be a 5G network, a 5G network in combination with a 4G network, or any other appropriate network.

The method comprises the following steps.

At step 731, the second NF provides contact information of the second NF and a private ID corresponding to the user ID to the relay entity.

At step 732, the second NF resolves the private ID into the user ID upon a request from a first NF in the network.

At step 732, the second NF sends the user ID to the first NF.

In an example, the second NF further generates the contact information and the private ID before providing them to the relay entity.

In an example, the contact information further indicates type of the second NF.

In an example, the private ID is an encrypted version of the user ID or a temporary ID mapping to the user ID.

In an example, the network is a 5G mobile communication network.

In an example, the user ID is a Subscription Permanent Identifier (SUPI) or a Generic Public Subscription Identifier (GPSI) of the remote UE.

In an example, if the method is used in a Control Plane (CP) based security procedure, the first NF is a SMF of the relay entity, the second NF is a PAnF of the remote UE, and the contact information and the private ID are provided via an AMF of the relay entity to the relay entity.

In an example, the contact information includes a Public Land Mobile Network (PLMN) ID of the remote UE and Routing Indicator of the PAnF of the remote UE.

In an example, if the method is used in a Control Plane (CP) based security procedure, the first NF is a SMF of the relay entity, the second NF is an AUSF of the remote UE, and the contact information and the private ID are provided via an AMF of the relay entity to the relay entity.

In an example, the contact information includes the PLMN ID of the remote UE and Routing Indicator of the AUSF of the remote UE.

In an example, if the method is used in a User Plane (UP) based security procedure, the first NF is a SMF of the relay entity, the second NF is a PKMF of the remote UE, In an example, the contact information and the private ID are provided via a PKMF of the relay entity to the relay entity.

In an example, the contact information and the private ID are provided via the remote UE to the relay entity.

In an example, the contact information includes a PLMN ID of the remote UE and Routing Indicator of the PKMF of the remote UE.

In an example, the request is received via the PKMF of the relay entity from the SMF of the relay entity.

In an example, the second NF further fetches the private ID from a Unified Data Management entity of the remote UE, or a Unified Repository Management entity of the remote UE before providing them to the relay entity.

In an example, the second NF further receives a hash calculated via a hash function from a seed mapped to the user ID distributed from the second NF, for verifying whether the remote UE is attached to the relay entity.

In an example, if the method is used in a User Plane (UP) based security procedure and if the user ID is a Generic Public Subscription Identifier (GPSI) of the remote UE, then the first NF is a SMF of the relay entity, the second NF is a Unified Data Management entity of the remote UE or a Unified Repository Management entity of the remote UE.

Figure 7D:
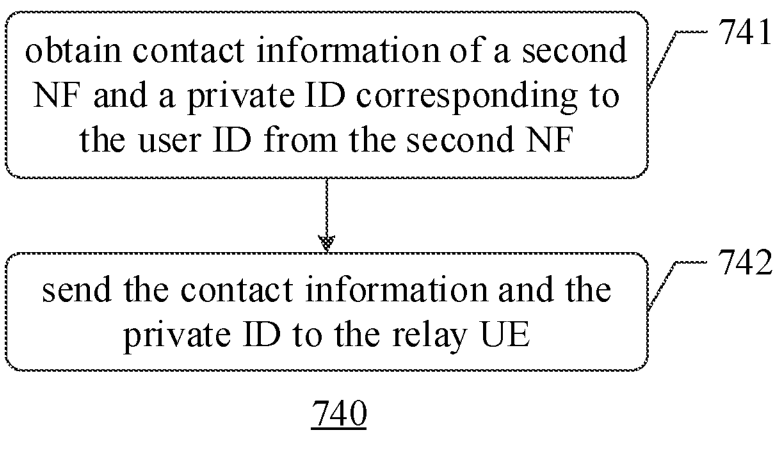

FIG. 7*d* illustrates a flowchart of a method 740 for a remote UE to obtain its user ID under privacy protection according to the present disclosure. The network is a wireless communication network according to embodiments of the present disclosure. The remote UE attaches to a ProSe UE-to-Network relay entity capable of supporting connectivity to the wireless communication network for the UE. The wireless communication network here may be a 5G network, a 5G network in combination with a 4G network, or any other appropriate network.

At step 741, the remote UE obtains contact information of a second NF and a private ID corresponding to the user ID from the second NF, wherein the contact information can be used by a first NF to contact the second NF to resolve the user ID based on the private ID.

At step 742, the remote UE sends the contact information and the private ID to the relay entity.

In an example, the contact information further indicates a type of the second NF.

In an example, the private ID is an encrypted version of the user ID or a temporary ID mapping to the user ID.

In an example, the network is a 5G mobile communication network.

In an example, the user ID is a Subscription Permanent Identifier (SUPI) or a Generic Public Subscription Identifier (GPSI) of the remote UE.

In an example, if the method is used in a User Plane (UP) based security procedure, the first NF is a SMF of the relay entity, the second NF is a ProSe Key Management Function (PKMF) of the remote UE.

In an example, the remote UE obtains the contact information and the private ID from a PKMF of the remote UE directly.

In an example, the contact information includes a PLMN ID of the remote UE and Routing Indicator of the PKMF of the remote UE.

In an example, the remote UE further obtains a hash calculated via a hash function from a seed mapped to the user ID distributed from the second NF, for verifying whether the remote UE is attached to the relay entity, and sends the hash to the relay entity together with the contact information and the private ID.

FIG. 8*a*-8*d* relates communication devices to a scenario where a user ID of a remote UE under privacy protection is provided by using a private ID provided to a first NF in a network by a second NF in the network, wherein connectivity between the remote UE and the network is provided by a relay entity.

Figure 8A:
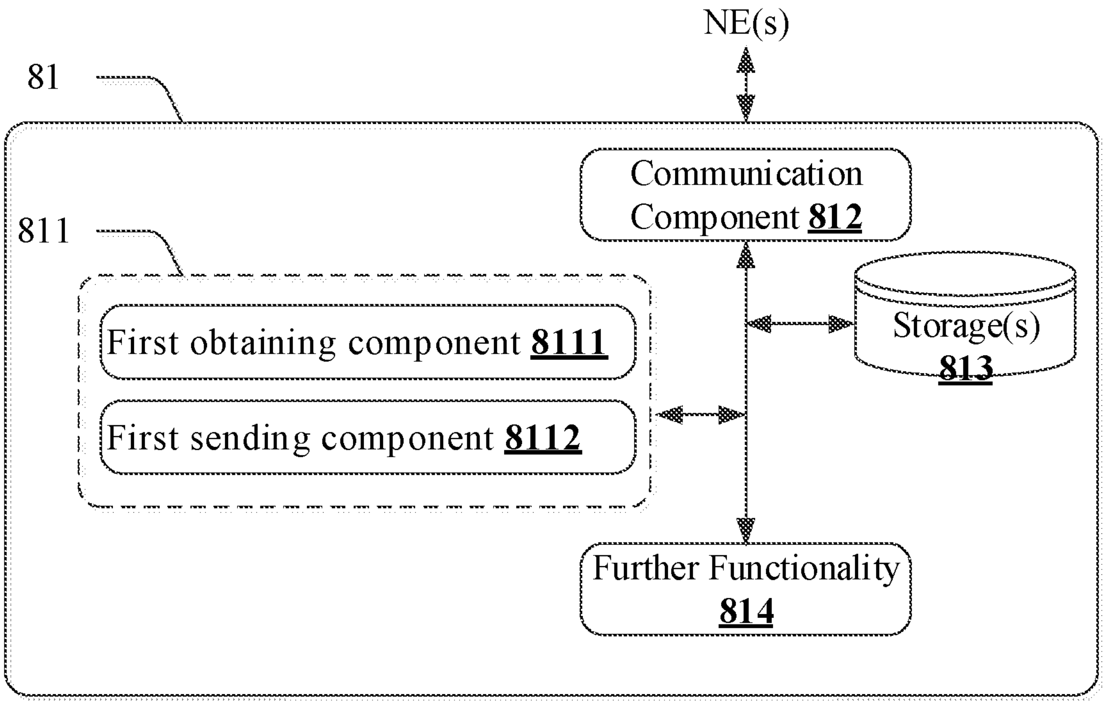
FIGS. 8*a*-8*d* illustrates a schematic block diagram of a communication device according to embodiments of the present disclosure.

FIG. 8*a* illustrates a schematic block diagram of a communication device operative in a communication network according to embodiments of the present disclosure. The communication device 81 may be a relay entity, and the communication network here may be a next generation network such as a 5G network, a next generation network in combination with a legacy network, or any other appropriate network.

The part of the communication device 81 which is most affected by the adaptation of the herein described method, e.g., a part of the method described with reference to FIGS. 4, 5*a*, 5*b*, FIG. 6 and FIG. 7*a*, is illustrated as an arrangement 811, surrounded by a dashed line. The communication device 81 and arrangement 811 may be further configured to communicate with other network entities (NE) such as the ProSe UE-to-Network relay entity via a communication component 812 which may also be regarded as part of the arrangement 811 (not shown). The communication component 812 comprises means for communication. The arrangement 811 or the communication device 81 may further comprise a further functionality 814, such as functional components providing regular UE functions, and may further comprise one or more storage(s) 813.

The arrangement 811 could be implemented, e.g., by one or more of: a processor or a microprocessor and adequate software and storage for storing of the software, a Programmable Logic Device (PLD) or other electronic component (s) or processing circuitry configured to perform the actions described above, and illustrated, e.g., in FIG. 7*a*. The arrangement 811 of the communication device 81 may be implemented and/or described as follows.

Referring to FIG. 8*a*, the communication device 81 may comprise a first obtaining component 8111 configured to obtain contact information of a second NF and a private ID corresponding to the user ID from the second NF, wherein the contact information can be used by the first NF to contact the second NF to resolve the user ID based on the private ID, and a first sending component 8112, configured to send the contact information and the private ID to the first NF. Details of the action may be found in FIG. 7*a* as described above and will not be iterated herein.

It should be noted that two or more different components in this disclosure may be logically or physically combined.

Figure 8B:
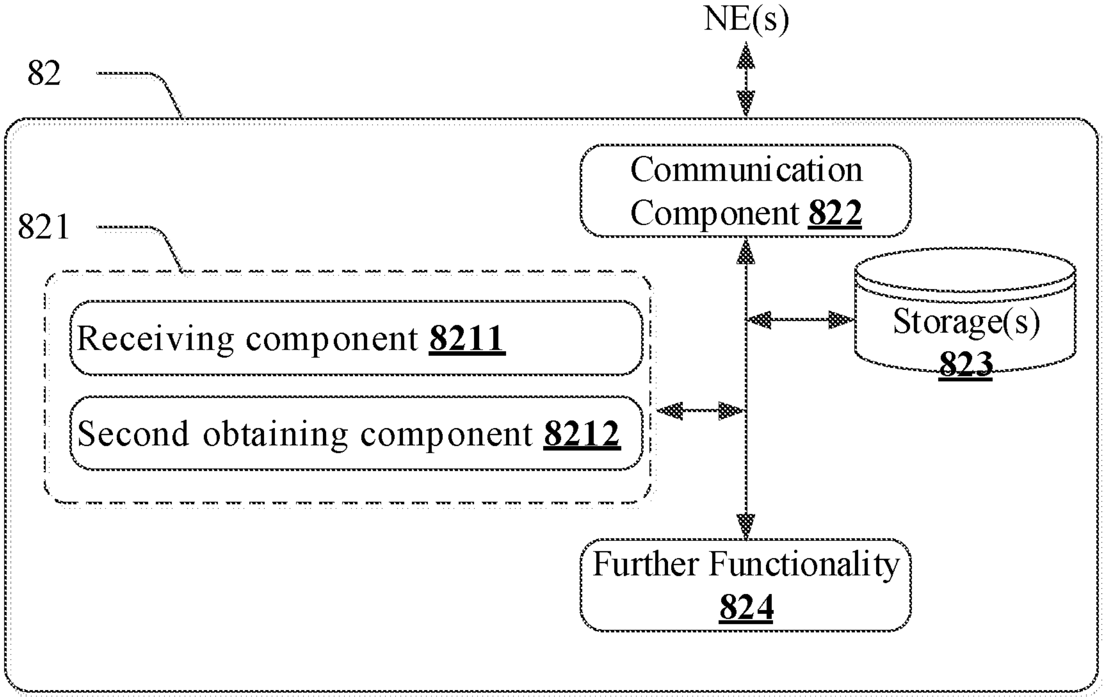

FIG. 8*b* illustrates a schematic block diagram of a communication device operative in a communication network according to embodiments of the present disclosure. The communication network here may be a next generation network such as a 5G network, a next generation network in combination with a legacy network, or any other appropriate network. The communication device 82 may be implement as a Session Management Function or part of Session Management Function. The communication device 82 may logically have separate entities for different parts of functions of the first NF, including the necessary coordination between the different parts of functions.

The part of the communication device 82 which is most affected by the adaptation of the herein described method, e.g., a part of the method described with reference to FIGS. 4, 5*a*, 5*b*, FIG. 6 and FIG. 7*b*, is illustrated as an arrangement 821, surrounded by a dashed line. The communication device 82 and arrangement 821 may be further configured to communicate with other network entities (NE) such as the ProSe UE-to-Network relay entity via a communication component 822 which may also be regarded as part of the arrangement 821 (not shown). The communication component 822 comprises means for communication. The arrangement 821 or the communication device 82 may further comprise a further functionality 824, such as functional components providing for example regular SMF functions, and may further comprise one or more storage(s) 823.

The arrangement 821 could be implemented, e.g., by one or more of: a processor or a microprocessor and adequate software and storage for storing of the software, a Programmable Logic Device (PLD) or other electronic component (s) or processing circuitry configured to perform the actions described above, and illustrated, e.g., in FIG. 7*b*. The arrangement 821 of the communication device 82 may be implemented and/or described as follows.

Referring to FIG. 8*b*, the communication device 82 may comprise a receiving component, configured to receive contact information of a second NF and a private ID corresponding to the user ID from the relay entity, wherein the contact information can be used by the first NF to contact the second NF to resolve the user ID based on the private ID; and a second obtaining component 8212, configured to obtain the user ID based on the private ID. Details of the action may be found in FIG. 7*b* as described above and will not be iterated herein.

It should be noted that two or more different components in this disclosure may be logically or physically combined.

Figure 8C:
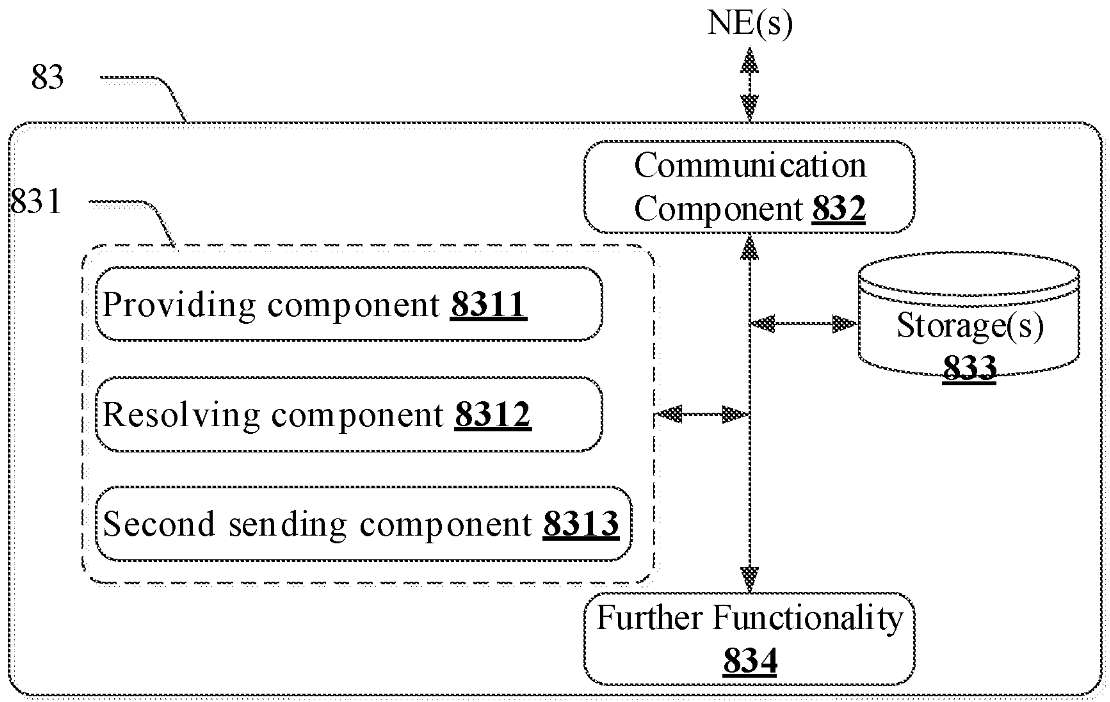

FIG. 8*c* illustrates a schematic block diagram of a communication device operative in a communication network according to embodiments of the present disclosure. The communication network here may be a next generation network such as a 5G network, a next generation network in combination with a legacy network, or any other appropriate network. The communication device 831 may be implement as a PKMF, PAnF, AUSF, UDM, etc. or part of it. The communication device 83 may logically have separate entities for different parts of functions of the PKMF, PAnF, AUSF, UDM, etc., including the necessary coordination between the different parts of functions.

The part of the communication device 83 which is most affected by the adaptation of the herein described method, e.g., a part of the method described with reference to FIGS. 4, 5*a*, 5*b*, FIG. 6 and FIG. 7*c*, is illustrated as an arrangement 831, surrounded by a dashed line. The communication device 83 and arrangement 831 may be further configured to communicate with other network entities (NE) such as the SMF entity via a communication component 832 which may also be regarded as part of the arrangement 831 (not shown). The communication component 832 comprises means for communication. The arrangement 831 or the communication device 83 may further comprise a further functionality 834, such as functional components providing for example regular functions of PKMF, PAnF, AUSF, UDM, etc., and may further comprise one or more storage(s) 833.

The arrangement 831 could be implemented, e.g., by one or more of: a processor or a microprocessor and adequate software and storage for storing of the software, a Programmable Logic Device (PLD) or other electronic component (s) or processing circuitry configured to perform the actions described above, and illustrated, e.g., in FIG. 7*c*. The arrangement 831 of the communication device 83 may be implemented and/or described as follows.

Referring to FIG. 8*c*, the communication device 83 may comprise a providing component 8311, a resolving component 8312 and a second sending component 8313. The providing component 8311 is configured to provide contact information of the second NF and a private ID corresponding to the user ID to the relay entity. The resolving component 8312 is configured to resolve the private ID into the user ID upon a request from a first NF in the network. The second sending component 8313 is configured to send the user ID to the first NF. Details of the action may be found in FIG. 7*c* as described above and will not be iterated herein.

It should be noted that two or more different components in this disclosure may be logically or physically combined.

Figure 8D:
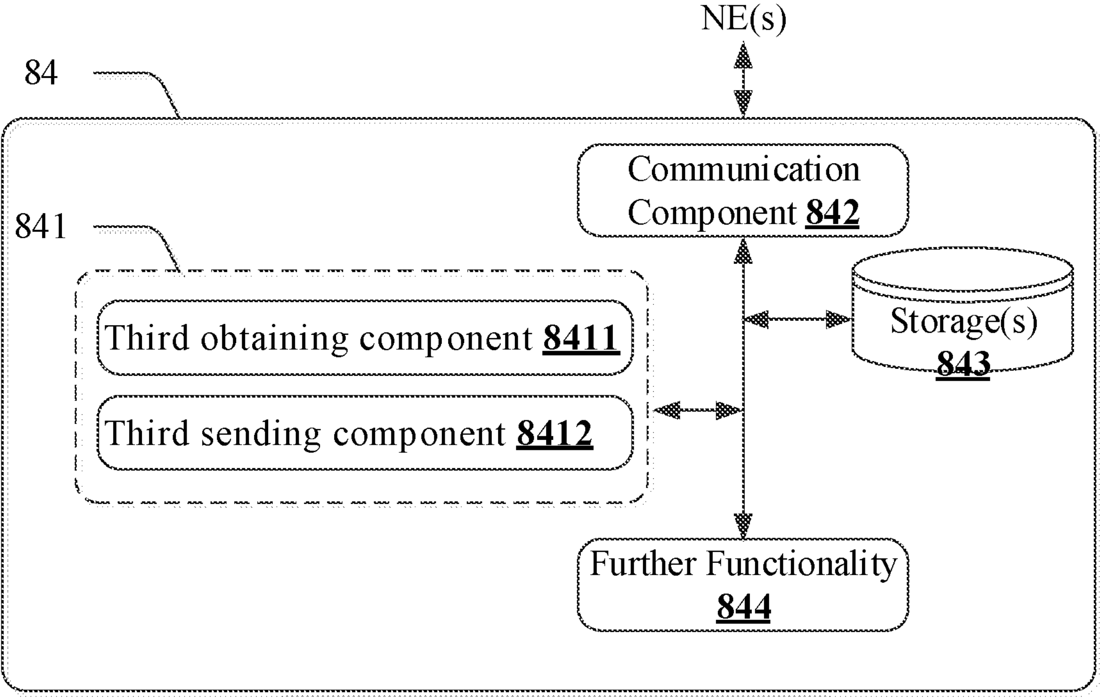

FIG. 8*d* illustrates a schematic block diagram of a communication device operative in a communication network according to embodiments of the present disclosure. The communication device 84 may be a remote UE, and the communication network here may be a next generation network such as a 5G network, a next generation network in combination with a legacy network, or any other appropriate network.

The part of the communication device 84 which is most affected by the adaptation of the herein described method, e.g., a part of the method described with reference to FIGS. 4, 5*a*, 5*b*, FIG. 6 and FIG. 7*d*, is illustrated as an arrangement 841, surrounded by a dashed line. The communication device 84 and arrangement 841 may be further configured to communicate with other network entities (NE) such as the remote UE via a communication component 842 which may also be regarded as part of the arrangement 841 (not shown). The communication component 842 comprises means for communication. The arrangement 841 or the communication device 84 may further comprise a further functionality 844, such as functional components providing regular UE functions, and may further comprise one or more storage(s) 813.

The arrangement 841 could be implemented, e.g., by one or more of: a processor or a microprocessor and adequate software and storage for storing of the software, a Programmable Logic Device (PLD) or other electronic component (s) or processing circuitry configured to perform the actions described above, and illustrated, e.g., in FIG. 7*d*. The arrangement 841 of the communication device 84 may be implemented and/or described as follows.

Referring to FIG. 8*d*, the communication device 84 may comprise a third obtaining component 8411 configured to obtain contact information of a second NF and a private ID corresponding to the user ID from the second NF, wherein the contact information can be used by a first NF to contact the second NF to resolve the user ID based on the private ID and a third sending component 8412 is configured to send the contact information and the private ID to the relay entity. Details of the action may be found in FIG. 7*d* as described above and will not be iterated herein.

It should be noted that two or more different components in this disclosure may be logically or physically combined.

Figure 9:
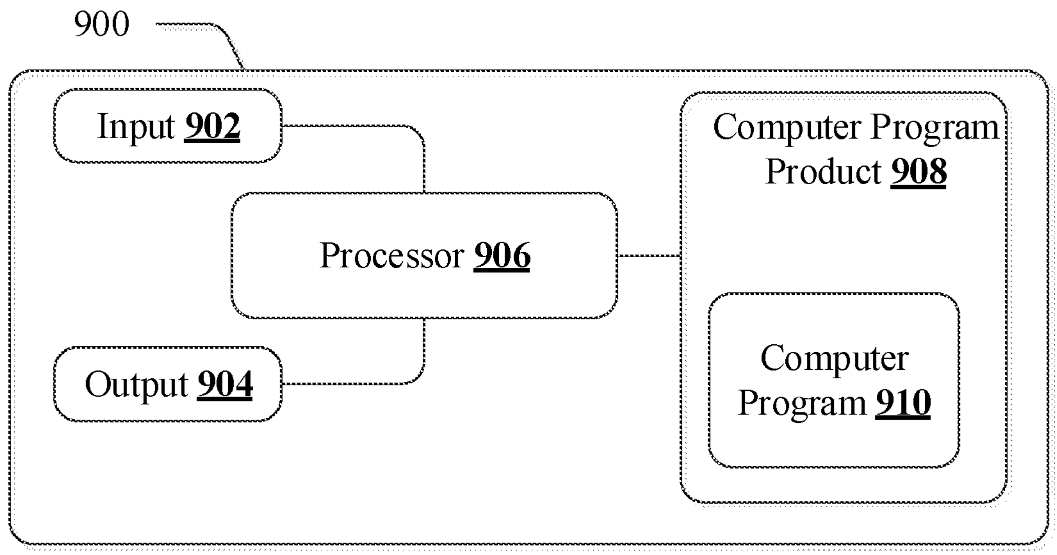
FIG. 9 schematically illustrates an embodiment of an arrangement which may be used for anomaly detection according to embodiments of the present disclosure.

FIG. 9 schematically shows an embodiment of an arrangement 900 which may be used in the communication device 81, 82, 83 and 84. Comprised in the arrangement 900 are here a processor 906, e.g., with a Digital Signal Processor (DSP). The processor 906 may be a single unit or a plurality of units to perform different actions of procedures described herein. The arrangement 900 may also comprise an input unit 902 for receiving signals from other entities, such as the PPI and an output unit 904 for providing signal(s) to other entities. The input unit and the output unit may be arranged as an integrated network element, or a hardware component such as a sensing component.

Furthermore, the arrangement 900 comprises at least one computer program product 908 in the form of a non-volatile or volatile storage, e.g., an Electrically Erasable Programmable Read-Only Memory (EEPROM), a flash memory and a hard drive, and those from a network or a cloud connected via the input unit 902 and output unit 904. The computer program product 908 comprises a computer program 910, which comprises code/computer readable instructions, which when executed by the processor 906 in the arrangement 900 causes the arrangement 900 and/or the communication device 81, 82, 83 and 84 in which it is comprised to perform the actions, e.g., of the procedure described earlier in conjunction with FIGS. 4, 5*a*, 5*b*, 6, and 7*a*-7*d*.

The computer program 910 may be configured as a computer program code structured in computer program modules. Hence, in an exemplifying embodiment when the arrangement 900 is used in the communication device 81, 82, 83 and 84, the code in the computer program of the arrangement 900 when executed, will cause the processor 906 to perform the steps as described with reference to FIGS. 4, 5*a*, 5*b*, 6, and 7*a*-7*d*.

The processor 906 may be a single Central Processing Unit (CPU), but could also comprise two or more processing units. For example, the processor 906 may include general purpose microprocessors, instruction set processors and/or related chip sets and/or special purpose microprocessors such as Application Specific Integrated Circuits (ASIC). The processor 906 may also comprise board memory for caching purposes. The computer program 910 may be carried by a computer program product 908 connected to the processor 906. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories. The computer program product may also comprise an electronic signal, optical signal, or radio signal, etc. in which the computer program is transmitted.

As a whole or by scenario, the second NF only resolves and provides a user ID of the remote UE upon a request from the first NF, thus there is no way for the Relay UE 216 to obtain or know the user ID even if the Relay UE 216 contacts the second NF to ask the user ID (in this case, the second NF will reject the Relay UE 216), which ensures the privacy protection for the user ID. In addition, because the private ID may be fully controlled by the second NF, and could be designated for interim (e.g., one time) usage, this may prevent a malicious Relay UE 216 to get the user ID, replaying the user ID to launch an attack to the remote UE While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method for a relay entity to provide a user Identity (ID) of a remote User Equipment (UE) under privacy protection to a first Network Function (NF) in a network, wherein connectivity between the remote UE and the network is provided by the relay entity, the method comprising:

obtaining contact information of a second NF and a private ID corresponding to the user ID from the second NF, wherein the contact information is used by the first NF to contact the second NF, to resolve the user ID based on the private ID; and sending the contact information and the private ID to the first NF;

wherein the contact information further indicates a type of the second NF.

2. The method of claim 1, wherein the private ID is an encrypted version of the user ID or a temporary ID mapping to the user ID.

3. The method of claim 1, wherein the network is a Fifth Generation (5G) mobile communication network.

4. The method of claim 3, wherein the user ID is a Subscription Permanent Identifier (SUPI) or a Generic Public Subscription Identifier (GPSI) of the remote UE.

5. The method of claim 3, wherein, in a case where the method is used in a Control Plane (CP) based security procedure, the first NF is a Session Management Function (SMF) of the relay entity, the second NF is a ProSe Anchor Function (PAnF) of the remote UE, and the relay entity obtains the contact information and the private ID from the PAnF via an Access and Mobility Management Function (AMF) of the relay entity.

6. The method of claim 5, wherein the contact information includes a Public Land Mobile Network (PLMN) ID of the remote UE and Routing Indicator of the PAnF.

7. The method of claim 3, wherein, in a case where the method is used in a Control Plane (CP) based security procedure, the first NF is a SMF of the relay entity, the second NF is an Authentication Server Function (AUSF) of the remote UE, and the relay entity obtains the contact information and the private ID from the AUSF via an AMF of the relay entity.

8. The method of claim 7, wherein the contact information includes a PLMN ID of the remote UE and Routing Indicator of the AUSF.

9. The method of claim 3, wherein, in a case where the method is used in a User Plane (UP) based security procedure, the first NF is a SMF of the relay entity, the second NF is a ProSe Key Management Function (PKMF) of the remote UE.

10. The method of claim 9, wherein the relay entity obtains the contact information and the private ID from the PKMF of the remote UE via a PKMF of the relay entity.

11. The method of claim 9, wherein the relay entity obtains the contact information and the private ID from the PKMF of the remote UE via the remote UE.

12. The method of claim 11, further comprising:

obtaining a hash calculated via a hash function from a seed mapped to the user ID distributed from the second NF, for verifying whether the remote UE is attached to the relay entity; and sending the hash to the first NF together with the contact information and the private ID.

13. The method of claim 9, wherein the contact information includes a PLMN ID of the remote UE and Routing Indicator of the PKMF of the remote UE.

14. A method for a first Network Function (NF) in a network to obtain a user Identity (ID) of a remote User Equipment (UE) under privacy protection, wherein connectivity between the remote UE and the network is provided by a relay entity, the method comprising:

receiving contact information of a second NF and a private ID corresponding to the user ID from the relay entity, wherein the contact information is used by the first NF to contact the second NF to resolve the user ID based on the private ID; and obtaining the user ID based on the private ID;

wherein if the user ID and the private ID had already been stored by the first NF, then the first NF obtains the user ID by retrieving the stored user ID based on the private ID, otherwise the first NF obtains the user ID by contacting the second NF to ask the second NF to resolve the user ID based on the private ID.

15. The method of claim 14, wherein the network is a Fifth Generation (5G) mobile communication network.

16. The method of claim 15, wherein the user ID is a Subscription Permanent Identifier (SUPI) or a Generic Public Subscription Identifier (GPSI) of the remote UE.

17. The method of claim 16, wherein, in a case where the method is used in a Control Plane (CP) based security procedure, the first NF is a Session Management Function (SMF) of the relay entity, the second NF is a ProSe Anchor Function (PAnF) of the remote UE, and wherein the contact information includes a Public Land Mobile Network (PLMN) ID of the remote UE and Routing Indicator of the PAnF of the remote UE.

18. The method of claim 15, wherein, in a case where the method is used in a Control Plane (CP) based security procedure, the first NF is a SMF of the relay entity, the second NF is an Authentication Server Function (AUSF) of the remote UE, and wherein the contact information includes a PLMN ID of the remote UE and Routing Indicator of the AUSF of the remote UE.

19. The method of claim 15, wherein, in case where the method is used in a User Plane (UP) based security procedure, the first NF is a SMF of the relay entity, the second NF is a ProSe Key Management Function (PKMF) of the remote UE, and wherein the contact information includes a PLMN ID of the remote UE and Routing Indicator of the PKMF of the remote UE.

20. The method of claim 19, wherein the SMF of the relay entity contacts the PKMF of the remote UE via a PKMF of the relay entity to resolve the user ID based on the private ID, and wherein the PKMF of the remote UE further contacts a Unified Data Management (UDM) entity of the remote UE, or a Unified Repository Management entity of the remote UE to resolve the user ID based on the private ID.

21. A relay entity configured to provide a user Identity (ID) of a remote User Equipment (UE) under privacy protection to a first Network Function (NF) in a network, wherein connectivity between the remote UE and the network is provided by the relay entity, the relay entity comprising:

a communications interface; and processing circuitry configured to:

obtain, via the communications interface, contact information of a second NF and a private ID corresponding to the user ID from the second NF, wherein the contact information is used by the first NF to contact the second NF, to resolve the user ID based on the private ID; and send, via the communications interface, the contact information and the private ID to the first NF;

wherein the contact information further indicates a type of the second NF.

22. A first Network Function (NF) configured for operation in a network, the operation including obtaining a user Identity (ID) of a remote User Equipment (UE) under privacy protection, wherein connectivity between the remote UE and the network is provided by a relay entity, the first NF comprising:

a communications interface; and processing circuitry configured to:

receive, via the communications interface, contact information of a second NF and a private ID corresponding to the user ID from the relay entity, wherein the contact information is used by the first NF to contact the second NF to resolve the user ID based on the private ID; and obtain, via the communications interface, the user ID based on the private ID;

wherein if the user ID and the private ID had already been stored by the first NE, then the first NF obtains the user ID by retrieving the stored user ID based on the private ID, otherwise the first NF obtains the user ID by contacting the second NF to ask the second NF to resolve the user ID based on the private ID.

* * * * *